US012704882B2

(12) United States Patent
Park et al.

(10) Patent No.: US 12,704,882 B2
(45) Date of Patent: Aug. 11, 2026

(54) ELECTRONIC DEVICE COMPRISING ELECTROSTATIC INDUCTION STRUCTURE

(71) Applicant: SAMSUNG ELECTRONICS CO., LTD., Suwon-si (KR)

(72) Inventors: Jaehwan Park, Suwon-si (KR); Kwonho Song, Suwon-si (KR); Jungchul An, Suwon-si (KR); Shinhyuk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 17/989,278

(22) Filed: Nov. 17, 2022

(65) Prior Publication Data

US 2023/0079135 A1 Mar. 16, 2023

Related U.S. Application Data

(63) Continuation of application No. PCT/KR2021/005798, filed on May 10, 2021.

(30) Foreign Application Priority Data

Jun. 9, 2020 (KR) ........................ 10-2020-0069573
Aug. 3, 2020 (KR) ........................ 10-2020-0096905

(51) Int. Cl.
*G06F 1/16* (2006.01)

(52) U.S. Cl.
CPC .......... *G06F 1/1656* (2013.01); *G06F 1/1652* (2013.01); *G06F 1/1681* (2013.01)

(58) Field of Classification Search
CPC ..... G06F 1/1656; G06F 1/1652; G06F 1/1681
See application file for complete search history.

(56) References Cited

U.S. PATENT DOCUMENTS 10,201,102 B2 * 2/2019 Lee ..................... H04M 1/0202
10,912,197 B2 * 2/2021 Park ...................... G06F 1/1652
(Continued)

FOREIGN PATENT DOCUMENTS

CN 101655617 A 2/2010
CN 101765289 A 6/2010
(Continued)

OTHER PUBLICATIONS

Extended European Search Report dated Sep. 21, 2023 issued in European Patent Application No. 21822819.5.
(Continued)

*Primary Examiner* — Rockshana D Chowdhury
*Assistant Examiner* — Douglas R Burtner
(74) *Attorney, Agent, or Firm* — Nixon & Vanderhye P.C.

(57) ABSTRACT

According to various embodiments, an electronic device comprises: a first housing; a second housing; a hinge device including a hinge connecting the first housing and the second housing to be foldable; a display panel including a flexible display arranged to be supported by the second housing from the first housing through the hinge device, and comprising a window layer, and a bending portion disposed under the window layer corresponding to the second housing and at least partially extending outwardly; and a conductive plate disposed under the display panel and electrically connected to the ground, wherein the bending portion bypasses a rear surface of the at least one conductive plate and includes a flexible display electrically connected to the rear surface; wherein when the display panel is viewed from above, the conductive plate may comprise at least one exposed portion exposed further outward than the edge of the display panel around the bending portion.

20 Claims, 17 Drawing Sheets

(56) References Cited

U.S. PATENT DOCUMENTS 11,061,439 B2 7/2021 Kwon et al.
2003/0086049 A1* 5/2003 Yamazaki .............. H05K 3/361 349/149
2006/0110949 A1* 5/2006 Jee ..................... H01R 13/2442 439/64
2008/0094536 A1* 4/2008 Kim ..................... H05K 1/0203 445/23
2011/0111807 A1* 5/2011 Kido ...................... H05K 9/002 455/566
2013/0002993 A1* 1/2013 Oh .................... G02F 1/133528 349/96
2014/0085836 A1* 3/2014 Mo ..................... H04M 1/0266 361/679.01
2016/0105951 A1* 4/2016 Lee ....................... G06F 1/1626 361/751
2016/0306391 A1 10/2016 Yang
2017/0045916 A1* 2/2017 Kim ......................... H01Q 1/48
2017/0201013 A1* 7/2017 Choi ...................... H01Q 21/28
2017/0250460 A1* 8/2017 Shin .................... H04M 1/0277
2017/0346164 A1* 11/2017 Kim .................... H04M 1/0266
2019/0081394 A1* 3/2019 Edwards ............. H04M 1/0266
2019/0350081 A1* 11/2019 Park ....................... H05K 1/144
2020/0060020 A1 2/2020 Park et al.
2020/0133047 A1 4/2020 Isobe
2020/0196496 A1 6/2020 Shin
2020/0267838 A1* 8/2020 An ........................ G06F 1/1641
2020/0383247 A1 12/2020 Jin et al.
2020/0402447 A1* 12/2020 An ....................... H10D 89/911
2021/0105894 A1 4/2021 Oh et al.
2021/0132718 A1 5/2021 Xu et al.
2021/0174044 A1 6/2021 Jo et al.
2023/0047246 A1* 2/2023 An ........................ G06F 1/1652
2023/0051260 A1* 2/2023 An .......................... H04M 1/18

FOREIGN PATENT DOCUMENTS

CN 107065287 A 8/2017
CN 108449450 A 8/2018
CN 110473467 A 11/2019
CN 110677982 A 1/2020
KR 10-2015-0051789 5/2015
KR 10-2015-0066317 6/2016
KR 10-2019-0060305 6/2019
KR 10-2019-0066795 6/2019
KR 10-2020-0021172 2/2020
KR 10-2021-0040699 4/2021

OTHER PUBLICATIONS

International Search Report for PCT/KR2021/005798 mailed Aug. 17, 2021, 4 pages.
Written Opinion of the ISA for PCT/KR2021/005798 mailed Aug. 17, 2021, 4 pages.
Korean Office Action issued Oct. 24, 2024 in corresponding Korean Patent Application No. 10-2020-0096905.
Chinese First Office Action dated Mar. 19, 2026 issued in Chinese Patent Application No. 202180041290.2 and English translation, 21 pp.

* cited by examiner 100
125
151
120
127
126
122
150
A1
110
140
118 117b
112
116b
113
x
y
z
130a
116a
117a
130c
111
129
115
123b
128
121
130b
123
130
101

ELECTRONIC DEVICE COMPRISING ELECTROSTATIC INDUCTION STRUCTURE

CROSS-REFERENCE TO RELATED APPLICATIONS

This application is a continuation of International Application No. PCT/KR2021/005798 designating the United States, filed on May 10, 2021, in the Korean Intellectual Property Receiving Office and claiming priority to Korean Patent Application No. 10-2020-0069573, filed on Jun. 9, 2022, in the Korean Intellectual Property Office, and to Korean Patent Application No. 10-2020-0096905, filed on Aug. 3, 2020, in the Korean Intellectual Property Office, the disclosures of all of which are incorporated by reference herein in their entireties.

BACKGROUND

Field

The disclosure relates to an electronic device including an electrostatic induction structure.

Description of Related Art

Electronic devices are gradually becoming slimmer, becoming more rigid, being strengthened in design aspects, and being improved in functional elements thereof to be differentiated from each other. These electronic devices are being transformed into various shapes, departing from a uniform rectangular shape. For example, an electronic device may have a transformable structure that is convenient to carry and enables a large-screen display to be used at the time of using the electronic device. In an effort to provide an electronic device with such a transformable structure, a foldable electronic device may include a flexible display supported by at least two housings that operate in a manner of being folded or unfolded with respect to each other, and various improvement measures are being provided according to application of flexible displays.

A foldable electronic device may include a hinge device, and first and second housings movably connected to each other via the hinge device. This foldable electronic device may be operated in an in-folding and/or out-folding manner by rotating the first housing via the hinge device in a range of 0 to 360 degrees with respect to the second housing. The foldable electronic device may include a flexible display disposed to cross the first housing and the second housing in an open state.

The flexible display may include a bendable display panel. The display panel may include a bending portion, which extends to one side and is electrically connected (e.g., grounded) to a conductive plate disposed on the rear surface of the flexible display, and in which a control circuit (e.g., a display driver IC (DDI)) is disposed. For example, when the flexible display is disposed in the foldable electronic device and the display panel is viewed from above, the bending portion may protrude outward beyond an edge of the display panel.

In the foldable electronic device, static electricity introduced from the exterior may be introduced into the foldable electronic device through an edge of the flexible display. Such static electricity may not be guided to the conductive plate electrically connected to the ground of the electronic device, but may directly or indirectly affect the display panel via the bending portion that protrudes beyond the edge of the display panel, thereby causing malfunction such as a blackening phenomenon or bit missing (e.g., a short phenomenon of data lines) of the display panel.

SUMMARY

Embodiments of the disclosure provide an electronic device including an electrostatic induction structure.

Embodiments of the disclosure provide an electronic device having an electrostatic induction structure capable of reducing malfunction of a display panel by guiding static electricity flowing from an edge of a flexible display via the bending portion, to a ground of the electronic device.

According to various example embodiments, an electronic device may include: a first housing; a second housing; a hinge device configured to foldably interconnect the first housing and the second housing; and a flexible display supported from the first housing to the second housing across the hinge device, wherein the flexible display may include: a display panel disposed under a window layer corresponding to the second housing and including a bending portion that at least partially extends outward; and a conductive plate disposed under the display panel and electrically connected to a ground, wherein the bending portion bypasses the rear surface of the at least one conductive plate and the flexible display is electrically connected to a rear surface of the conductive plate, wherein the conductive plate may include at least one exposed portion which is exposed to the outside of an edge of the display panel around the bending portion when the display panel is viewed from above.

According to various example embodiments of the disclosure, the conductive plate disposed on the rear surface of the display panel includes at least one exposed portion exposed (e.g., protruding) to the outside of the edge of the display panel in the vicinity of the bending portion of the display panel when the display panel is viewed from above. Therefore, it is possible to guide static electricity introduced from an edge of the flexible display to a ground of the electronic device, which is helpful for reducing malfunction and/or damage of the display panel.

In addition, various effects directly or indirectly identified through the disclosure may be provided.

BRIEF DESCRIPTION OF THE DRAWINGS

In connection with the description of the drawings, the same or similar components may be denoted by the same or similar reference numerals. Further, the above and other aspects, features and advantages of certain embodiments of the present disclosure will be more apparent from the following detailed description, taken in conjunction with the accompanying drawings, in which:

FIG. 8B is a partial cross-sectional view illustrating the conductive connecting member of FIG. 8A according to various embodiments;

FIG. 11A is a diagram illustrating a flexible display according to various embodiments; and FIG. 11B is a partial cross-sectional view of an electronic device to which the conductive plate and the window layer of FIG. 11A are applied according to various embodiments.

DETAILED DESCRIPTION

Figure 1:
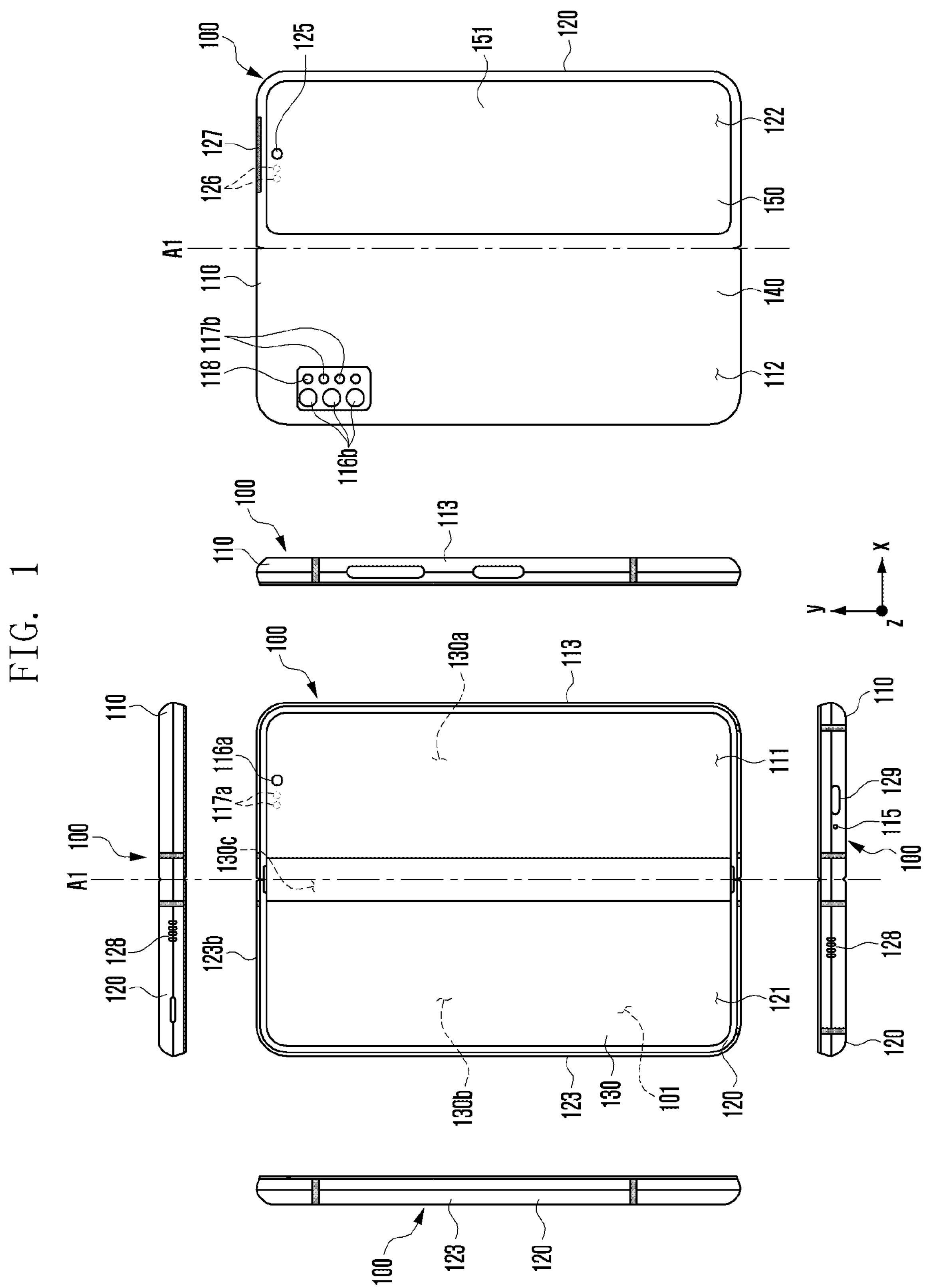
FIG. 1 is a diagram illustrating an unfolded state of an electronic device according to various embodiments.
Figure 2:
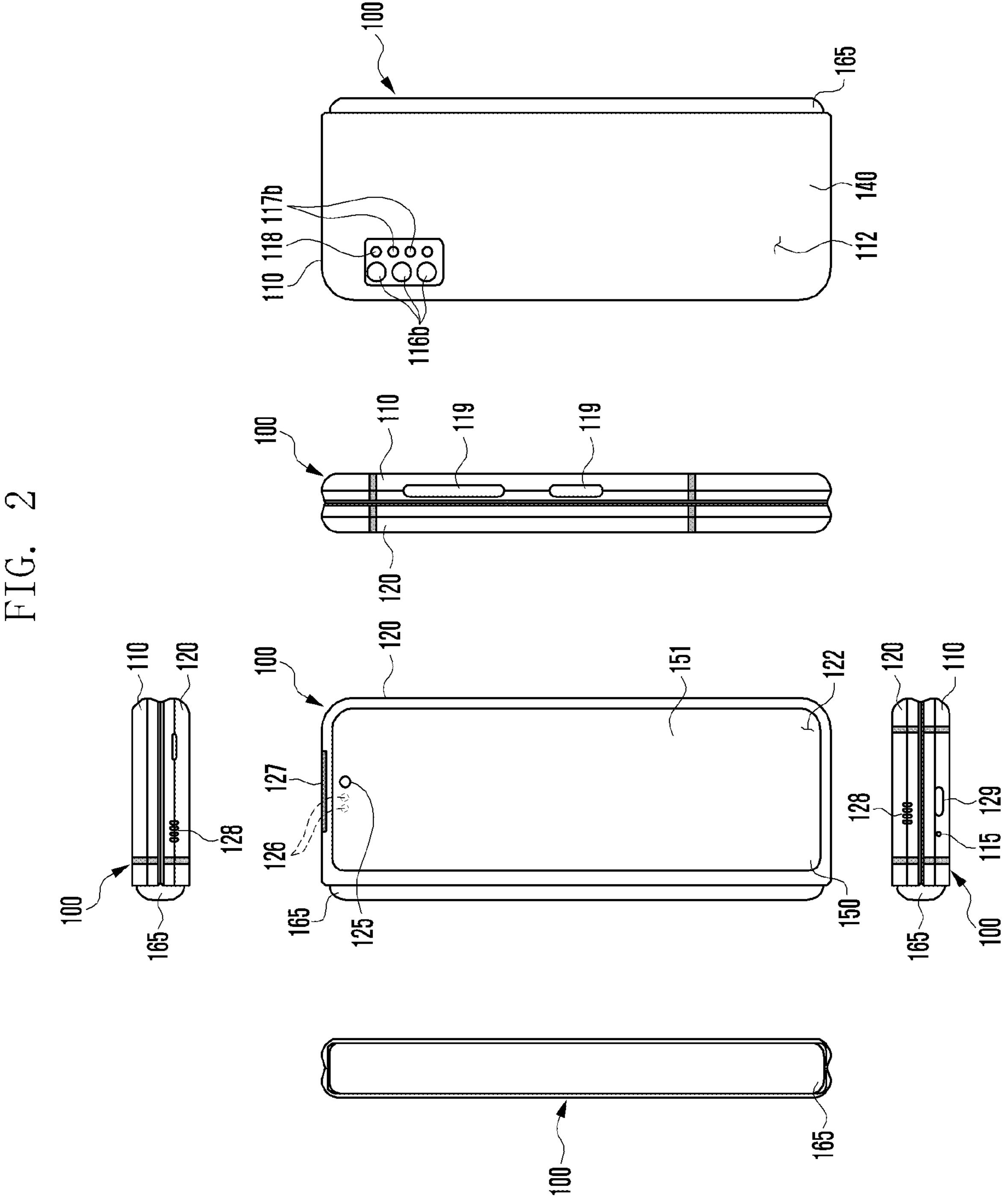
FIG. 2 is a diagram illustrating a folded state of the electronic device of FIG. 1 according to various embodiments.

FIG. 1 is a diagram illustrating an unfolded state of an electronic device 100 according to various embodiments. FIG. 2 is a diagram illustrating a folded state of the electronic device 100 of FIG. 1 according to various embodiments.

Referring to FIGS. 1 and 2, the electronic device 100 may include a pair of housings 110 and 120 (e.g., foldable housing) rotatably coupled based on a folding axis A through a hinge device (e.g., a hinge device 164 of FIG. 3) to be foldable with respect to each other, a first display 130 (e.g., flexible display, foldable display, or main display) disposed through the pair of housings 110 and 120, and/or a second display 151 (e.g., sub-display) disposed through the second housing 120. According to certain embodiments, at least a portion (e.g., hinge devices 164 of FIG. 3) of the hinge device (e.g., the hinge device 164 of FIG. 3) may be disposed to not be visible from the outside through the first housing 110 and the second housing 120 and disposed to not be visible from the outside through a hinge housing 165 covering a foldable portion in an unfolded state. In this disclosure, a surface in which the first display 130 is disposed may be defined as a front surface of the electronic device 100, and an opposite surface of the front surface may be defined as a rear surface of the electronic device 100. Further, a surface enclosing a space between the front surface and the rear surface may be defined as a side surface of the electronic device 100.

Figure 3:
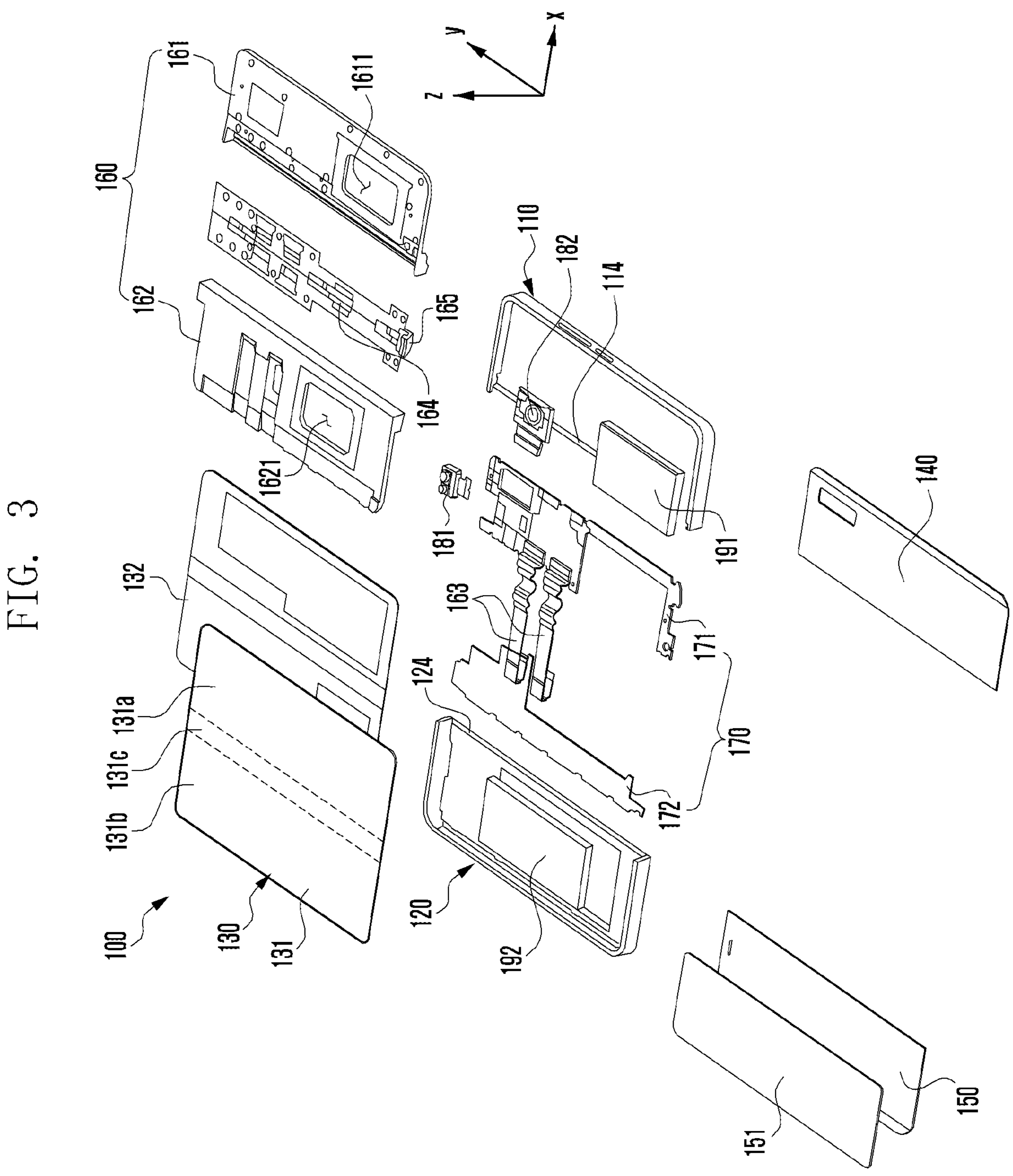
FIG. 3 is an exploded perspective view of an electronic device according to various embodiments.

According to various embodiments, the pair of housings 110 and 120 may include a first housing 110 and second housing 120 disposed to be foldable with respect to each other through the hinge device (e.g., the hinge device 164 of FIG. 3). According to certain embodiments, the pair of housings 110 and 120 are not limited to the shape and coupling illustrated in FIGS. 1 and 2, and may be implemented by a combination and/or coupling of other shapes or parts. According to certain embodiments, the first housing 110 and the second housing 120 may be disposed at both sides based on the folding axis A, and have an overall symmetrical shape with respect to the folding axis A. According to various embodiments, the first housing 110 and the second housing 120 may be folded asymmetrically based on the folding axis A. According to certain embodiments, the first housing 110 and the second housing 120 may have different angles or distances from each other according to whether the electronic device 100 is in an unfolded state, a folded state, or an intermediate state.

According to various embodiments, when the electronic device 100 is in an unfolded state, the first housing 110 may include a first surface 111 connected to the hinge device (e.g., the hinge device 164 of FIG. 3) and disposed to face the front of the electronic device 100, a second surface 112 facing in a direction opposite to that of the first surface 111, and/or a first side member 113 enclosing at least a portion of a first space between the first surface 111 and the second surface 112. According to certain embodiments, when the electronic device 100 is in an unfolded state, the second housing 120 may include a third surface 121 connected to the hinge device (e.g., the hinge device 164 of FIG. 3), and disposed to face the front of the electronic device 100, a fourth surface 122 facing in a direction opposite that of the third surface 121, and/or a second side member 123 enclosing at least a portion of a second space between the third surface 121 and the fourth surface 122. According to certain embodiments, the first surface 111 may face in substantially the same direction as that of the third surface 121 when the electronic device is in an unfolded state and at least partially face the third surface 121 when the electronic device is in a folded state. According to certain embodiments, the electronic device 100 may include a recess 101 formed to receive the first display 130 through structural coupling of the first housing 110 and the second housing 120. According to certain embodiments, the recess 101 may have substantially the same size as that of the first display 130.

According to various embodiments, the hinge housing 165 (e.g., hinge cover) may be disposed between the first housing 110 and the second housing 120 and be disposed to cover a hinge device (e.g.: the hinge devices 164 of FIG. 3) disposed in the hinge housing 165. According to certain embodiments, the hinge housing 165 may be covered by a part of the first housing 110 and the second housing 120 or may be exposed to the outside according to an unfolded state, a folded state, or an intermediate state of the electronic device 100. For example, when the electronic device 100 is in an unfolded state, at least a portion of the hinge housing 165 may be covered by the first housing 110 and the second housing 120 to not be substantially exposed. According to certain embodiments, when the electronic device 100 is in a folded state, at least a portion of the hinge housing 165 may be exposed to the outside between the first housing 110 and the second housing 120. According to certain embodiments, when the first housing 110 and the second housing 120 are in an intermediate state folded with a certain angle, the hinge housing 165 may be at least partially exposed to the outside of the electronic device 100 between the first housing 110 and the second housing 120. For example, an area in which the hinge housing 165 is exposed to the outside may be smaller than that in a fully folded state. According to certain embodiments, the hinge housing 165 may include a curved surface.

According to various embodiments, when the electronic device 100 is in an unfolded state (e.g., the state of FIG. 1), the first housing 110 and the second housing 120 form an angle of approximately 180 degrees, and a first area 130*a*, a folding area 130*c*, and a second area 130*b* of the first display 130 may form the same flat surface and be disposed to face in substantially the same direction. In an embodiment, when the electronic device 100 is in an unfolded state, the first housing 110 may rotate at an angle of approximately 360 degrees with respect to the second housing 120 so that the second surface 112 and the fourth surface 122 may be reversely folded to face each other (out-folding method).

According to various embodiments, when the electronic device 100 is in the folded state (e.g., the state of FIG. 2), the first surface 111 of the first housing 110 and the third surface 121 of the second housing 120 may be disposed to face each other. In this case, the first area 130*a* and the second area 130*b* of the first display 130 may form a narrow angle (e.g., a range of 0 degree to approximately 10 degree) each other through the folding area 130*c* and be disposed to face each other. According to certain embodiments, at least a portion of the folding area 130*c* may be transformed into a curved shape having a predetermined curvature. According to certain embodiments, when the electronic device 100 is in an intermediate state, the first housing 110 and the second housing 120 may be disposed at a certain angle to each other. In this case, the first area 130*a* and the second area 130*b* of the first display 130 may form an angle larger than the folded state and smaller than the unfolded state, and a curvature of the folding area 130*c* may be smaller than that of the folded state and be larger than that of the unfolded state. In various embodiments, the first housing 110 and the second housing 120 may form an angle that may stop at a specified folding angle between the folded state and the unfolded state through the hinge device (e.g., the hinge device 164 of FIG. 3) (free stop function). In various embodiments, the first housing 110 and the second housing 120 may be operated while being pressurized in an unfolding direction or a folding direction based on a specified inflection angle through the hinge device (e.g., the hinge device 164 of FIG. 3).

According to various embodiments, the electronic device 100 may include at least one of at least one display 130 and 151, an input device 115, sound output devices 127 and 128, sensor modules 117*a*, 117*b*, and 126, camera modules 116*a*, 116*b*, and 125, a key input device 119, an indicator, or a connector port 129 disposed in the first housing 110 and/or the second housing 120. In various embodiments, the electronic device 100 may omit at least one of the components or may additionally include at least one other component.

According to various embodiments, the at least one display 130 and 151 may include a first display 130 (e.g., flexible display) disposed to receive support from the third surface 121 of the second housing 120 through the hinge device (e.g., the hinge device 164 of FIG. 3) from the first surface 111 of the first housing 110, and a second display 151 disposed to be visible at least partially from the outside through the fourth surface 122 in an inner space of the second housing 120. As another example, the second display 151 may be disposed to be visible from the outside through the second surface 112 in an inner space of the first housing 110. According to certain embodiments, the first display 130 may be mainly used in an unfolded state of the electronic device 100, and the second display 151 may be mainly used in a folded state of the electronic device 100. According to certain embodiments, when the electronic device 100 is in an intermediate state, the electronic device 100 may control the first display 130 and/or the second display 151 to be usable based on a folding angle of the first housing 110 and the second housing 120.

According to various embodiments, the first display 130 may be disposed in a receiving space formed by a pair of housings 110 and 120. For example, the first display 130 may be disposed in the recess 101 formed by the pair of housings 110 and 120, and when the electronic device 100 is in an unfolded state, the first display 130 may be disposed to occupy substantially most of the front surface of the electronic device 100. According to certain embodiments, the first display 130 may include a flexible display whose at least a partial area may be transformed into a flat surface or a curved surface. According to certain embodiments, the first display 130 may include a first area 130*a* facing the first housing 110, a second area 130*b* facing the second housing 120, and a folding area 130*c* connecting the first area 130*a* and the second area 130*b* and facing the hinge device (e.g., the hinge device 164 of FIG. 3). According to certain embodiments, area division of the first display 130 is an example physical division by a pair of housings 110 and 120 and the hinge device (e.g., the hinge device 164 of FIG. 3), and the first display 130 may be displayed as a substantially seamless single full screen through the pair of housings 110 and 120 and the hinge device (e.g., the hinge device 164 of FIG. 3). According to certain embodiments, the first area 130*a* and the second area 130*b* may have an overall symmetrical shape or a partially asymmetrical shape based on the folding area 130*c*.

According to various embodiments, the electronic device 100 may include a first rear cover 140 disposed at the second surface 112 of the first housing 110 and a second rear cover 150 disposed at the fourth surface 122 of the second housing 120. In various embodiments, at least a portion of the first rear cover 140 may be integrally formed with the first side member 113. In various embodiments, at least a portion of the second rear cover 150 may be integrally formed with the second side member 123. According to certain embodiments, at least one cover of the first rear cover 140 and the second rear cover 150 may be formed with a substantially transparent plate (e.g., a polymer plate or a glass plate including various coating layers) or an opaque plate. According to certain embodiments, the first rear cover 140 may be formed by an opaque plate such as, for example, coated or tinted glass, ceramic, polymer, metal (e.g., aluminum, stainless steel (STS), or magnesium), or a combination of at least two of the above materials. According to certain embodiments, the second rear cover 150 may be formed through a substantially transparent plate such as glass or polymer, for example. Accordingly, the second display 151 may be disposed to be visible from the outside through the second rear cover 150 in an inner space of the second housing 120.

According to various embodiments, the input device 115 may include a microphone. In various embodiments, the input device 115 may include a plurality of microphones disposed to detect a direction of a sound. According to certain embodiments, the sound output devices 127 and 128 may include speakers. According to certain embodiments, the sound output devices 127 and 128 may include a call receiver 127 disposed through the fourth surface 122 of the second housing 120 and an external speaker 128 disposed through at least a portion of the second side member 123 of the second housing 120. In various embodiments, the input device 115, the sound output devices 127 and 128, and the connector 129 may be disposed in spaces of the first housing 110 and/or the second housing 120 and be exposed to an external environment through at least one hole formed in the first housing 110 and/or the second housing 120. In various embodiments, holes formed in the first housing 110 and/or the second housing 120 may be commonly used for the input device 115 and the sound output devices 127 and 128. In various embodiments, the sound output devices 127 and 128 may include a speaker (e.g., piezo speaker) operating while excluding a hole formed in the first housing 110 and/or the second housing 120.

According to various embodiments, the camera modules 116*a*, 116*b*, and 125 may include a first camera module 116*a* disposed at the first surface 111 of the first housing 110, a second camera module 116*b* disposed at the second surface 112 of the first housing 110, and/or a third camera module 125 disposed at the fourth surface 122 of the second housing 120. According to certain embodiments, the electronic device 100 may include a flash 118 disposed near the second camera module 116*b*. According to certain embodiments, the flash 118 may include, for example, a light emitting diode or a xenon lamp. According to certain embodiments, the camera modules 116*a*, 116*b*, and 125 may include one or a plurality of lenses, an image sensor, and/or an image signal processor. In various embodiments, at least one camera module of the camera modules 116*a*, 116*b*, and 125 may include two or more lenses (e.g., wide-angle and telephoto lenses) and image sensors and be disposed together at any one surface of the first housing 110 and/or the second housing 120.

According to various embodiments, the sensor modules 117*a*, 117*b*, and 126 may generate an electrical signal or a data value corresponding to an internal operating state of the electronic device 100 or an external environmental state. According to certain embodiments, the sensor modules 117*a*, 117*b*, and 126 may include a first sensor module 117*a* disposed at the first surface 111 of the first housing 110, a second sensor module 117*b* disposed at the second surface 112 of the first housing 110, and/or a third sensor module 126 disposed at the fourth surface 122 of the second housing 120. In various embodiments, the sensor modules 117*a*, 117*b*, and 126 may include at least one of a gesture sensor, a grip sensor, a color sensor, an infrared (IR) sensor, an illuminance sensor, an ultrasonic sensor, an iris recognition sensor, or a distance detection sensor (e.g., time of flight (TOF) sensor or light detection and ranging (LiDAR)).

According to various embodiments, the electronic device 100 may further include a sensor module, for example, at least one of an atmospheric pressure sensor, a magnetic sensor, a biometric sensor, a temperature sensor, a humidity sensor, or a fingerprint recognition sensor. In various embodiments, the fingerprint recognition sensor may be disposed through at least one of the first side member 113 of the first housing 110 and/or the second side member 123 of the second housing 120.

According to various embodiments, the key input device 119 may be disposed to be exposed to the outside through the first side member 113 of the first housing 110. In various embodiments, the key input device 119 may be disposed to be exposed to the outside through the second side member 123 of the second housing 120. In various embodiments, the electronic device 100 may not include some or all of the key input devices 119, and the non-included key input devices 119 may be implemented into other forms such as soft keys on at least one display 130 and 151. As an embodiment, the key input device 119 may be implemented using a pressure sensor included in at least one display 130 and 151.

According to various embodiments, the connector port 129 may include a connector (e.g., USB connector or interface connector port module (IF module)) for transmitting and receiving power and/or data to and from an external electronic device. In various embodiments, the connector port 129 may further include a separate connector port (e.g., ear jack hole) for performing together a function for transmitting and receiving an audio signal to and from an external electronic device or for performing a function of transmitting and receiving an audio signal.

According to various embodiments, at least one camera module 116*a* and 125 of the camera modules 116*a*, 116*b*, and 125, at least one sensor module 117*a* and 126 of the sensor modules 117*a*, 117*b*, and 126, and/or the indicator may be disposed to be exposed through at least one display 130 and 151. For example, the at least one camera module 116*a* and 125, the at least one sensor module 117*a* and 126, and/or the indicator may be disposed under a display area of the displays 130 and 151 in an interior space of the at least one housing 110 and 120 and be disposed to contact an external environment through an opening or transparent area perforated to a cover member (e.g., a window layer of the first display 130 and/or the second rear cover 150). In an embodiment, some camera modules or sensor modules 117*a* and 126 may be disposed to perform functions thereof without being visually exposed through the display. For example, an area facing the camera modules 116*a* and 125 and/or the sensor modules 117*a* and 126 disposed under the displays 130 and 151 (e.g., display panel) has an under display camera (UDC) structure; thus, a perforated opening may be unnecessary.

FIG. 3 is an exploded perspective view illustrating an electronic device 100 according to various embodiments.

Referring to FIG. 3, the electronic device 100 may include a first display 130, a second display 151, a hinge device 164, a support member assembly 160, at least one printed circuit board 170, a first housing 110, a second housing 120, a first rear cover 140, and/or a second rear cover 150.

According to various embodiments, the first display 130 may include a display panel 131 (e.g., flexible display panel) and one or more plates 132 or layers in which the display panel 131 is seated. According to certain embodiments, the display panel 131 may include a first panel area 131 corresponding to the first area (e.g., the first area 130*a* of FIG. 1) of the display 130, a second panel area 132 extended from the first panel area and corresponding to the second area (e.g., the second area 130*b* of FIG. 1) of the display 130, and a third area 131*c* connecting the first panel area 131 and the second panel area 132 and corresponding to a folding area (e.g., the folding area 130*c* of FIG. 1) of the display 130. According to certain embodiments, the one or more plates 132 may include a conductive plate (e.g., Cu sheet or SUS sheet) disposed between the display panel 131 and the support member assembly 160. According to certain embodiments, the one or more plates 132 may be formed to have substantially the same area as that of the first display 130, and an area facing a folding area (e.g., the folding area 130*c* of FIG. 1) of the first display 130 may be formed to be bendable. According to certain embodiments, the one or more plates 132 may include at least one auxiliary material layer (e.g., graphite member) disposed at a rear surface of the display panel 131. According to certain embodiments, the one or more plates 132 may be formed in a shape corresponding to the display panel 131.

According to various embodiments, the second display 151 may be disposed in a space between the second housing 120 and the second rear cover 150. According to certain embodiments, the second display 151 may be disposed to be visible from the outside through substantially the entire area of the second rear cover 150 in a space between the second housing 120 and the second rear cover 150.

According to various embodiments, the support member assembly 160 may include a first support member 161 (e.g., first support plate) and a second support member 162 (e.g., second support plate). According to certain embodiments, the first support member 161 may be foldably coupled to the second support member 162 through the hinge device 164. According to certain embodiments, the electronic device 100 may include at least one wiring member 163 (e.g., flexible printed circuit board (FPCB)) disposed from at least a portion of the first support member 161 across the hinge device 164 to a portion of the second support member 162. According to certain embodiments, the support member assembly 160 may be disposed between one or more plates 132 and at least one printed circuit board 170. According to certain embodiments, the first support member 161 may be disposed between the first area (e.g., the first area 130*a* of FIG. 1) of the first display 130 and a first printed circuit board 171. According to certain embodiments, the second support member 162 may be disposed between the second area (e.g., the second area 130*b* of FIG. 1) of the first display 130 and a second printed circuit board 172. According to certain embodiments, the at least one wiring member 163 and/or at least a portion of the hinge device 164 may be disposed to be supported through at least a portion of the support member assembly 160. According to certain embodiments, the at least one wiring member 163 may be disposed in a direction (e.g., x-axis direction) crossing the first support member 161 and the second support member 162. According to certain embodiments, the at least one wiring member 163 may be disposed in a direction (e.g., the x-axis direction) substantially perpendicular to the folding axis (e.g., the y-axis or the folding axis A of FIG. 1) of the folding area 130*c*.

According to various embodiments, the at least one printed circuit board 170 may include a first printed circuit board 171 disposed to face the first support member 161 or a second printed circuit board 172 disposed to face the second support member 162. According to certain embodiments, the first printed circuit board 171 and the second printed circuit board 172 may be disposed in an inner space formed by the support member assembly 160, the first housing 110, the second housing 120, and the first rear cover 140, and/or the second rear cover 150. According to certain embodiments, the first printed circuit board 171 and the second printed circuit board 172 may include a plurality of electronic components disposed to implement various functions of the electronic device 100. In various embodiments, the first support member 161 is a component of the first housing 110 and may be extended at least partially from the first side member 113 to a first space (e.g., first interior space) in which the first housing 110 is formed. In various embodiments, the second support member 162 is a component of the second housing 120 and may be extended at least partially from the second side member 123 to a second space (e.g., second interior space) in which the second housing 120 is formed.

According to various embodiments, the electronic device 100 may include a first printed circuit board 171 disposed in a first space of the first housing 110, a first battery 191 disposed at a position facing a first swelling hole 1611 of the first support member 161, at least one camera module 182 (e.g., the first camera module 116*a* and/or the second camera module 116*b* of FIG. 1), or at least one sensor module 181 (e.g., the first sensor module 117*a* and/or the second sensor module 117*b* of FIG. 1). According to certain embodiments, the electronic device 100 may include a second printed circuit board 172 disposed in the second space of the second housing 120 or a second battery 192 disposed in a position facing a second swelling hole 1621 of the second support member 162. According to certain embodiments, the first housing 110 may be integrally formed with the first support member 161. According to certain embodiments, the second housing 120 may be integrally formed with the second support member 162.

According to various embodiments, the first housing 110 may include a first rotation support surface 114, and the second housing 120 may include a second rotation support surface 124 corresponding to the first rotation support surface 114. According to certain embodiments, the first rotation support surface 114 and the second rotation support surface 124 may include curved surfaces corresponding to (naturally connected to) a curved outer surface of the hinge housing 165. According to certain embodiments, when the electronic device 100 is in an unfolded state, the first rotation support surface 114 and the second rotation support surface 124 may cover the hinge housing 165, thereby not exposing the hinge housing 165 from the rear surface of the electronic device 100 or exposing only a portion thereof. According to certain embodiments, when the electronic device 100 is in a folded state, the first rotation support surface 114 and the second rotation support surface 124 may rotate along the curved outer surface of the hinge housing 165 to expose at least a portion of the hinge housing 165 to the rear surface of the electronic device 100.

Figure 4A:
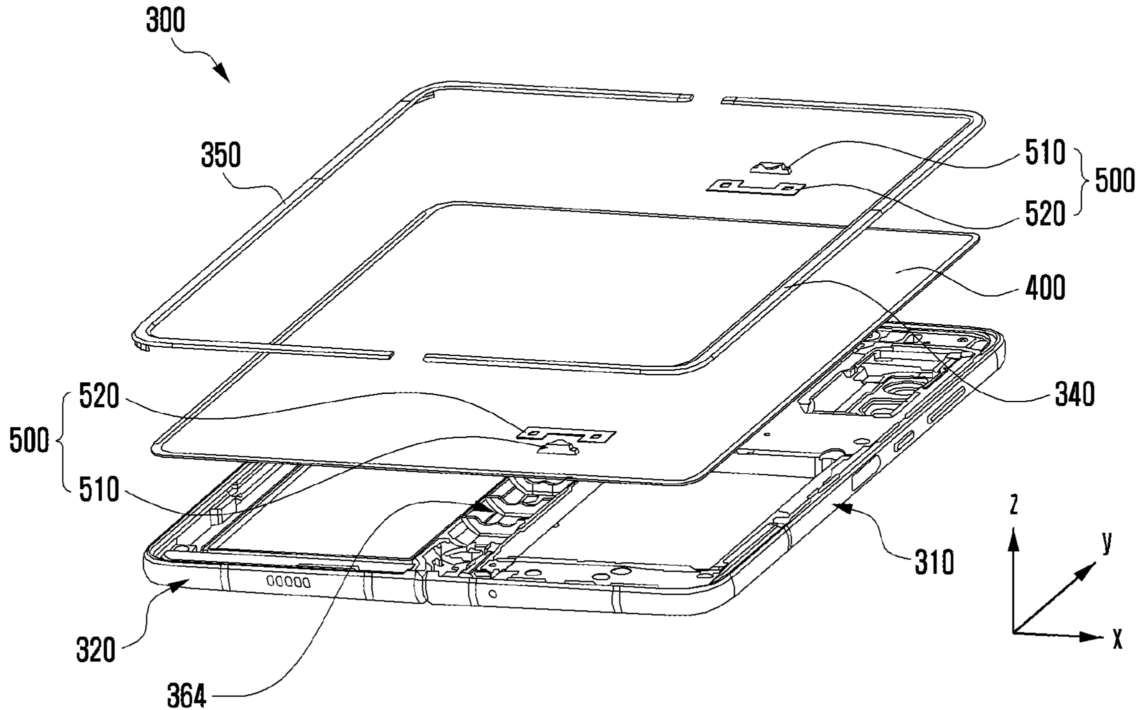
FIG. 4A is an exploded perspective view of an electronic device including a flexible display according to various embodiments.
Figure 4B:
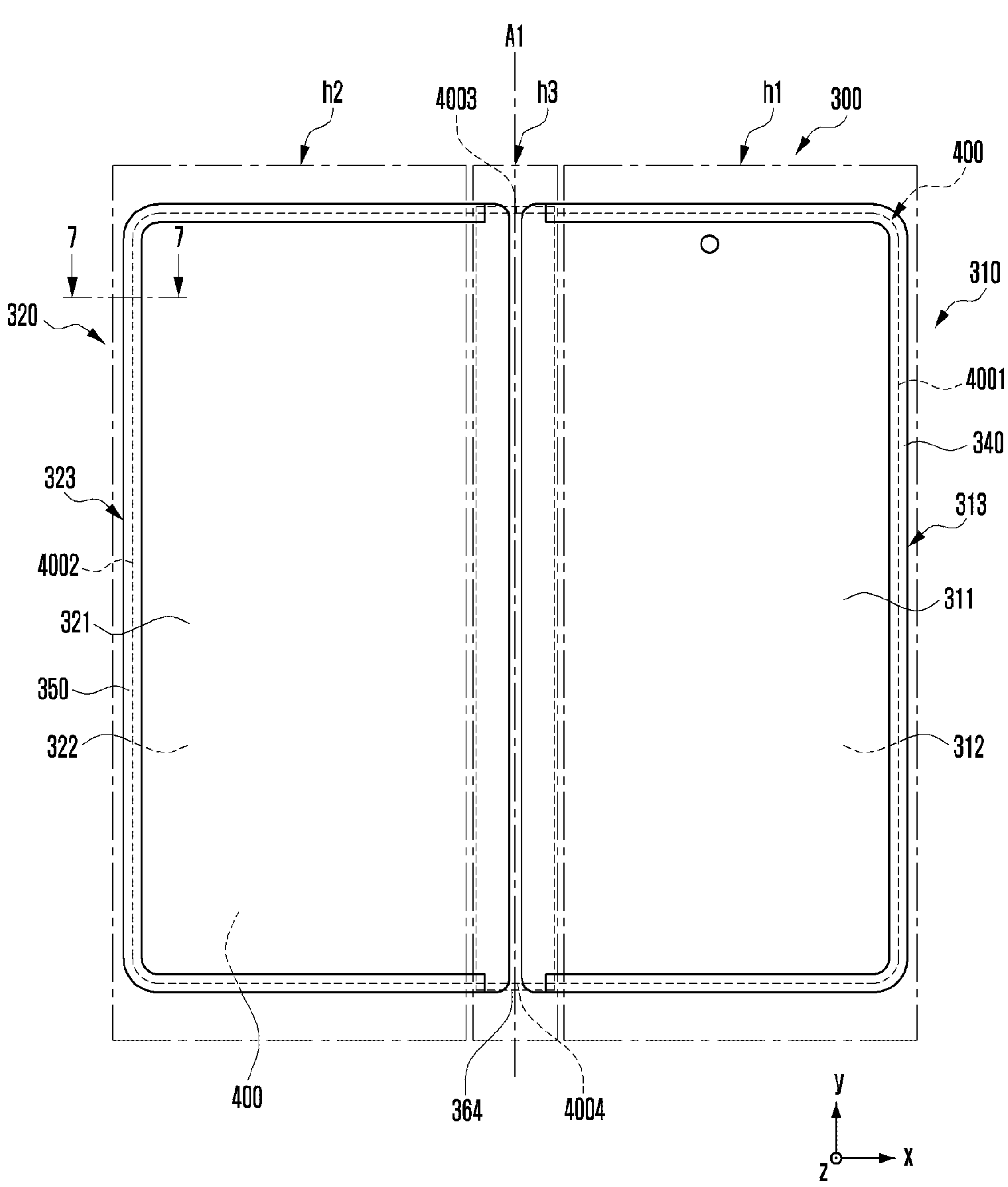
FIG. 4B is a diagram illustrating an example configuration of each area of the electronic device according to various embodiments.

FIG. 4A is an exploded perspective view of an electronic device 300 including a flexible display 400 according to various embodiments. FIG. 4B is a diagram illustrating an example configuration for each area of the electronic device 300 according to various embodiments.

The electronic device 300 of FIGS. 4A and 4B may be at least partially similar to the electronic device 100 of FIG. 1 or may further include various embodiments of the electronic device.

Referring to FIGS. 4A and 4B, the electronic device 300 (e.g., the electronic device 100 in FIG. 1) may include a first housing 310 (e.g., the first housing 110 in FIG. 1) (e.g., a first housing structure) including a first surface 311 (e.g., the first surface 111 in FIG. 1), a second surface 312 (e.g., the second surface 112 in FIG. 1) facing away from the first surface 311, and a first side member 313 (e.g., the first side member 113 in FIG. 1) surrounding a first space between the first surface 311 and the second surface 312. According to an embodiment, in the unfolded state, the electronic device 300 may include a second housing 320 (e.g., the second housing 120 in FIG. 1) (e.g., a second housing structure) including a third surface 321 (e.g., the third surface 121 in FIG. 1) oriented in the same direction as the first surface 311, a fourth surface 322 (e.g., the fourth surface 122 in FIG. 1) oriented in the same direction of the second surface 312, and a second side member 323 (e.g., the second side member 123 in FIG. 1)

surrounding a second space between the third surface 312 and the fourth surface 322. According to an embodiment, the first housing 310 and the second housing 320 may be installed to be foldable about a folding axis A1 with respect to each other via a hinge device 364 (e.g., the hinge device 164 in FIG. 3). For example, the electronic device 300 may maintain the folded or unfolded state by rotating the first housing 310 and the second housing 320 with respect to each other via the hinge device 364. According to an embodiment, in the folded state of the electronic device 300, the first surface 311 and the third surface 321 may face each other, and in the folded state, the first surface 311 and the third surface 321 may face the same direction. According to an embodiment, the electronic device 300 may include a flexible display 400 (e.g., the flexible display 130 in FIG. 1) disposed to at least partially cross the first surface 311 and the third surface 321. According to an embodiment, the flexible display 400 may be disposed to be supported by at least a partial area of the first housing 310, the hinge device 364, and the second housing 320.

According to various embodiments, the electronic device 300 (e.g., the electronic device 100 in FIG. 1) may include a first area h1 facing the first housing 310, a second area h2 facing the second housing structure 320, and a folding area h3 facing the hinge module 364. According to an embodiment, in the electronic device 300, the first housing 310 corresponding to the first area h1 may operate to be folded or unfolded with respect to the second housing 320 corresponding to the second area h2 via the hinge module 364 corresponding to the folding area h3.

According to various embodiments, the electronic device 300 may include at least one protective frame 340 or 350 (e.g., a decorative member or a decoration) disposed on the flexible display 400. According to an embodiment, the at least one protective frame 340, 350 may include a first protective frame 340 disposed on the flexible display 400 in the first area h1 and a second protective frame 350 disposed on the flexible display 400 in the second area h2. According to an embodiment, the protective frames 340 and 350 may be formed of a polymer material or a metal material, and may be disposed on each of the housings 310 and 320 through at least one of bonding, taping, fusion, or structural coupling.

According to various embodiments, the flexible display 400 may include a first edge 4001 facing at least a portion of the first housing 310, a second edge 4002 facing at least a portion of the second housing 320, a third edge 4003 interconnecting one end of the first edge 4001 and one end of the second edge 4002, and a fourth edge 4004 interconnecting the other end of the first edge 4001 and the other end of the second edge 4002. According to an embodiment, at least a portion of the first edge 4001, the third edge 4003, and the fourth edge 4004 of the flexible display 400 may be disposed to be invisible from the exterior by being disposed between the first housing 310 and the first protective frame 340. According to an embodiment, at least a portion of the second edge 4002, the third edge 4003, and the fourth edge 4004 of the flexible display 400 may be disposed to be invisible from the exterior by being disposed between the second housing 320 and the second protective frame 350.

According to various embodiments, a pair of protective frames 340 and 550 may be omitted in the folding area h3 corresponding to the hinge device 364 for the folding and unfolding operation of the first housing 310 and the second housing 320 about the hinge device 364. According to an embodiment, in the folding area h3, the electronic device 300 may include a protective structure 500 disposed to protect at least a portion of the third edge 4003 and at least a portion of the fourth edge 4004 of the flexible display 400 exposed to the exterior. According to an embodiment, the edges of the flexible display 400 exposed through the folding area h3 may be disposed to be at least partially invisible from the exterior via the protective structure 500. According to an embodiment, the protective structure 500 may include a support body 510 disposed by at least a portion of the hinge device 364 and a blocking member 520 supported by the support body 510 and disposed to at least partially cover the edges of the flexible display 400 from the exterior. In various embodiments, the support body 510 may include wing structures rotatably installed on the left and right sides of the support body 510 to support the blocking member 520, which is of a film type.

According to various embodiments, static electricity may be introduced into the interior of the electronic device 300 through a space between the flexible display 400 and the first support frame 340 and/or a space between the flexible display 400 and the second support frame 350. According to an embodiment, the introduced static electricity may be guided to at least one conductive structure electrically connected to a ground of the electronic device 300 via a static electricity induction structure according to various embodiments of the disclosure, whereby it is possible to prevent and/or reduce the display panel (e.g., the display panel 430 in FIG. 5) from malfunctioning and being damaged.

Figure 5:
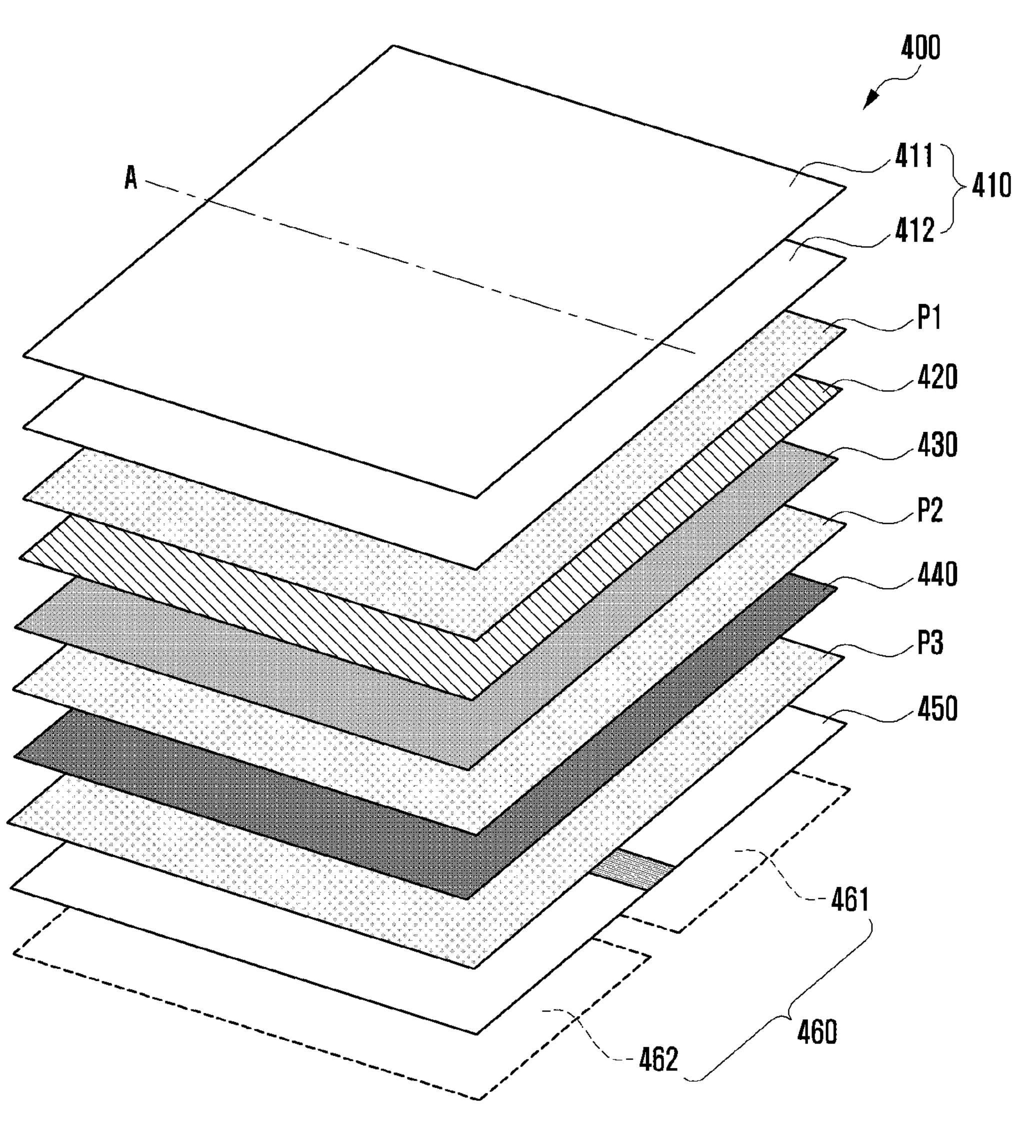
FIG. 5 is an exploded perspective view illustrating a stacked structure of a flexible display according to various embodiments.

FIG. 5 is a perspective view illustrating a stacked structure of the flexible display 400 according to various embodiments.

The flexible display 400 of FIG. 5 may be at least partially similar to the display 130 of FIG. 1 or may further include an embodiment of the flexible display.

Referring to FIG. 5, the flexible display 400 may include a window layer 410, and a polarizer (POL) 420 (e.g., a polarization film), a display panel 430, a polymer member 440, and a conductive plate 450, which are sequentially disposed on the rear surface of the window layer 410. According to an embodiment, the window layer 410 may include a polymer layer 411 (e.g., polyethylene terephthalate (PET)) and a glass layer (e.g., ultra-thin glass (UTG)) laminated with the polymer layer 411. According to an embodiment, the polymer layer may include PET or polyimide. According to an embodiment, the glass layer may include ultra-thin glass (UTG).

According to various embodiments, the window layer 410, the polarizer 420, the display panel 430, the polymer member 440, and the conductive plate 450 may be disposed to cross at least a portion of the first surface (e.g., the first surface 111 in FIG. 1) of the first housing (e.g., the first housing 110 in FIG. 1) and the third surface (e.g., the third surface 121 in FIG. 1) of the second housing (e.g., the second housing 120 in FIG. 1). According to an embodiment, the window layer 410, the polarization layer 420, the display panel 430, the polymer member 440, and the conductive plate 450 are bonded to each other via adhesives P1, P2, and P3. For example, the adhesives P1, P2, and P3 may include at least one of an optical clear adhesive (OCA), a pressure-sensitive adhesive (PSA), a heat-responsive adhesive, a general adhesive, and a double-sided tape. According to an embodiment, the flexible display 400 may include another adhesive member (e.g., a double-sided tape or a waterproof member) disposed at least partially on one surface of the conductive plate 450. According to an embodiment, the flexible display 400 may be attached to a support member assembly (e.g., the support member assembly 160 in FIG. 3) of an electronic device (e.g., the electronic device 100 of FIG. 3) via another adhesive member.

According to various embodiments, the polymer member 440 may be applied with a dark color (e.g., black) to be helpful for displaying the background when the display is turned off. According to an embodiment, the polymer member 440 may include a cushion for preventing/reducing the flexible display 400 from being damaged by absorbing an impact from the exterior of the electronic device.

According to various embodiments, the conductive plate 450 may be helpful for reinforcing the rigidity of the electronic device, and may be used to block ambient noise and to dissipate heat emitted from surrounding heat emission components. According to an embodiment, the conductive plate 450 may be at least one of steel use stainless (SUS) (e.g., stainless steel (STS)), Cu, Al, or a CLAD (e.g., a layered member in which SUS and Al are alternately arranged). In an embodiment, the conductive plate 450 may include other alloy materials. According to an embodiment, the conductive plate 450 may be integrally configured by interconnecting a portion facing a first housing (e.g., the first housing 310 in FIG. 4A) of an electronic device (e.g., the electronic device 300 in FIG. 4A) and a second portion facing a second housing (e.g., the second housing 320 in FIG. 4A) of the electronic device (e.g., the electronic device 300 in FIG. 4A) via a bendable portion (e.g., a portion provided with bendability by a lattice structure including a plurality of openings and/or slits) provided in a portion facing a hinge device (e.g., the hinge device 364 in FIG. 4A). In an embodiment, in the conductive plate 450, except for the portion facing the hinge device (the hinge device 364 in FIG. 4A), each of the portion facing the first housing (e.g., the first housing 310 in FIG. 4A) and the portion facing the second housing (e.g., the second housing 320 in FIG. 4A) may be separately formed. According to various embodiments, the flexible display 400 may further include metal reinforcing plates 460 disposed under the conductive plate in order to reinforce rigidity. According to an embodiment, the reinforcing plates 460 may include a first reinforcing plate 461 facing the first housing (e.g., the first housing 310 in FIG. 4A) and a second reinforcing plate 462 facing the second housing (e.g., the second housing 320 in FIG. 4A).

According to various embodiments, the flexible display 400 may include at least one functional member disposed between the polymer member 440 and the conductive plate 450. According to an embodiment, the functional member may include a graphite sheet for heat dissipation, a force touch FPCB, a fingerprint sensor FPCB, an antenna radiator for communication, a heat dissipation sheet, a conductive/non-conductive tape, or an open cell sponge. According to an embodiment, when the functional member is bendable, the functional member may be disposed from the first housing (e.g., the first housing 310 in FIG. 4A) to at least a portion of the second housing (e.g., the second housing 320 in FIG. 4A) across the hinge device (e.g., the hinge device 364 in FIG. 4A). As an embodiment, the flexible display 400 may further include a detection member configured to detect an input by an electromagnetic induction type writing member. According to an embodiment, the detection member may include a digitizer.

Figure 6A:
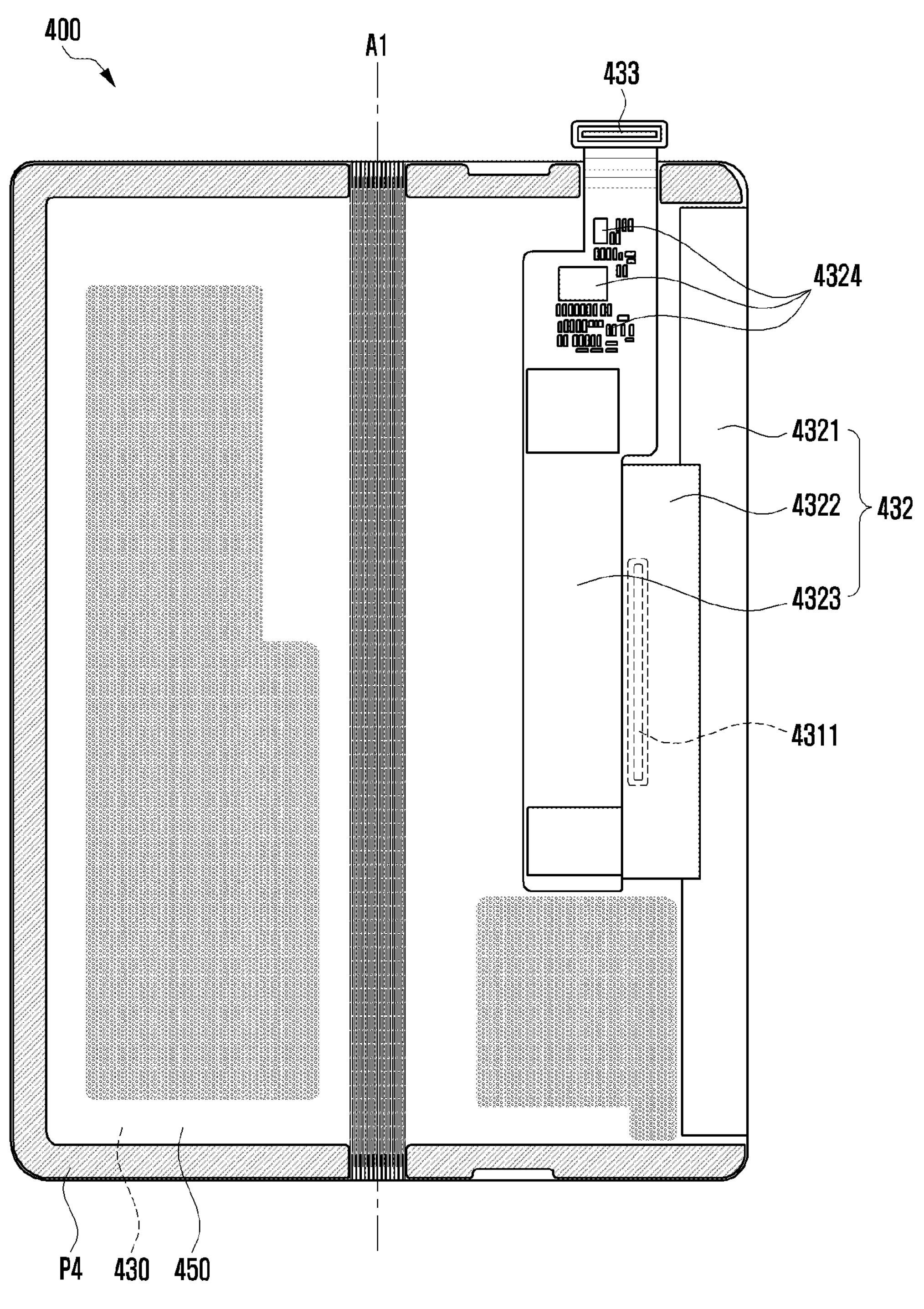
FIG. 6A is a diagram illustrating the rear surface of a flexible display according to various embodiments.
Figure 6B:
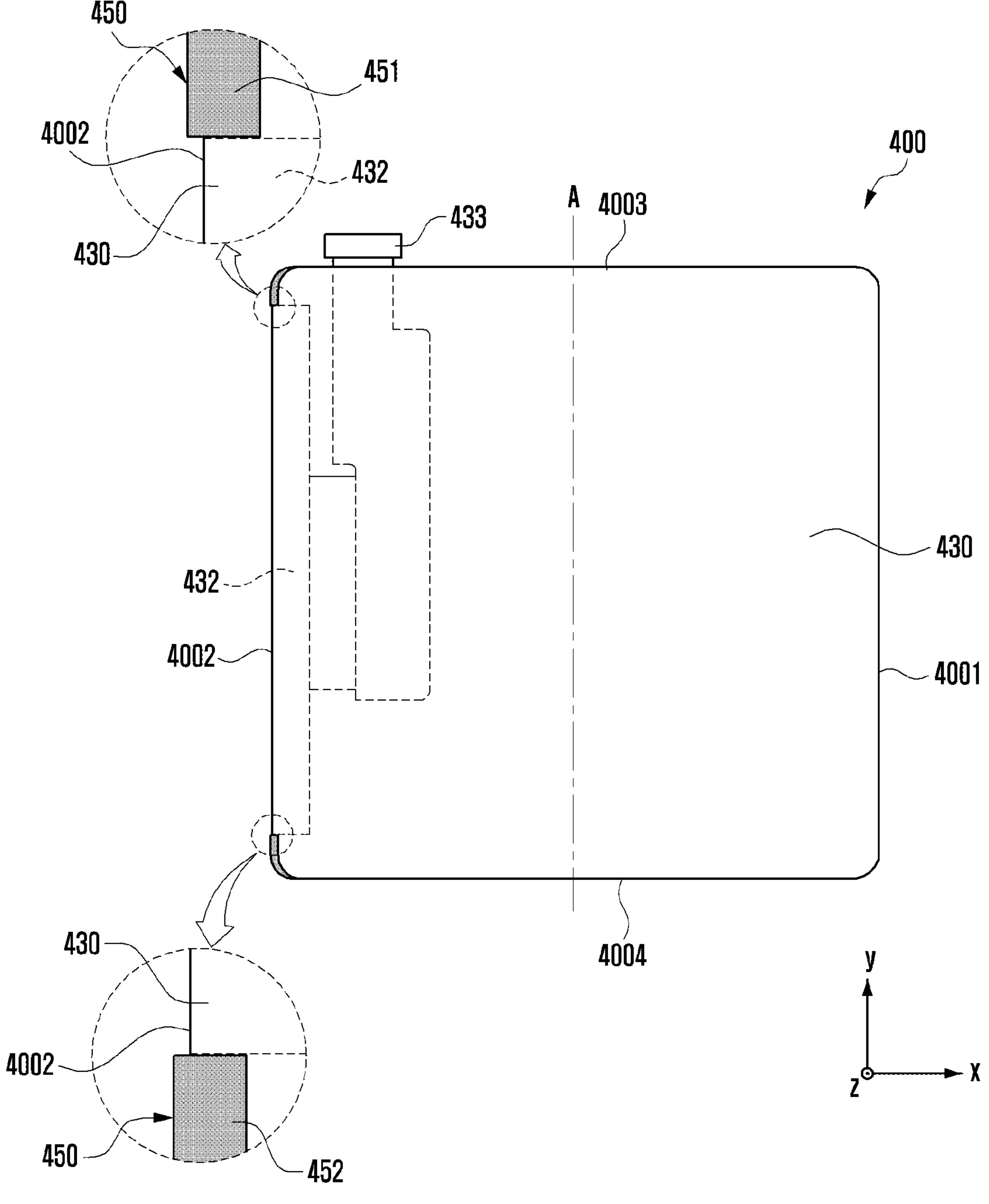
FIG. 6B is a diagram illustrating an arrangement of a display panel and a conductive plate according to various embodiments.

FIG. 6A is a diagram illustrating the rear surface of the flexible display 400 according to various embodiments. FIG. 6B is a diagram illustrating the display panel 430 and the conductive plate 450 according to various embodiments.

Referring to FIGS. 6A and 6B, the flexible display 400 may include a bending portion 432 disposed in a manner of being folded from the display panel 430 to at least a partial area of the rear surface of the flexible display 400. According to an embodiment, the bending portion 432 may include an extension 4321 extending from the display panel 430, a connection pad 4322 electrically connected from the extension 4321 and including a control circuit 4311, and a flexible printed circuit board (FPCB) 4323 electrically connected to the connection pad 4322. According to an embodiment, the control circuit 4311 may include a display driver IC (DDI) or a touch display driver IC (TDDI) mounted on the connection pad 4322 having an electrical wiring structure. According to an embodiment, the connection pad 4322 may include a separate FPCB or film including the control circuit 4311 disposed in a chip on film (COF) manner According to an embodiment, the control circuit 4311 may have a chip on panel or chip on plastic (COP) structure directly mounted on the extension 4321 without the connection pad 4322. According to an embodiment, the flexible display 400 may include a plurality of electrical elements 4324 disposed on the FPCB 4323. According to an embodiment, the flexible display 400 may include an electrical connector 433 extending from the FPCB 4323 and electrically connected to a second printed circuit board (e.g., the second printed circuit board 172 in FIG. 3) of the electronic device (e.g., the electronic device 100 in FIG. 3). According to an embodiment, the plurality of electrical elements 4324 may include a touch IC, a flash memory for display, a diode for preventing/reducing ESD, a pressure sensor, or a passive element such as a Decap. In an embodiment, when the bending portion 432 is disposed in an area of the flexible display 400 facing the first housing (e.g., the first housing 110 in FIG. 1), the electrical connector 433 may be electrically connected to a first printed circuit board (e.g., the first printed circuit board 171 in FIG. 3) of the electronic device (e.g., the electronic device 100 in FIG. 3).

According to various embodiments, the bending portion 432 extending from the display panel 430 may be folded via one edge (e.g., the second edge 4002) of the conductive plate 450, and may then disposed in a manner of coming into contact with the conductive plate 450. According to an embodiment, the conductive plate may be electrically connected to a ground of the electronic device, and the display panel may be electrically connected to the conductive plate via the bending portion.

According to various embodiments, the conductive plate 450 may include one or more exposed portions 451 and 452 extending to protrude beyond an edge of the display panel 430 in the vicinity of the bending portion 432 when the display panel 430 is viewed from above. According to an embodiment, the one or more exposed portions 451 and 452 may include a first exposed portion 451 disposed on one side of the bending portion 432 and/or a second exposed portion 452 disposed on the other side of the bending portion 432. According to an embodiment, the one or more exposed portions 451 and 452 may protrude outward beyond the bending portion 432 of the display panel 430 when the display panel 430 is viewed from above. Accordingly, static electricity introduced from the exterior of the electronic device 300 via the vicinity of the bending portion 432 of the display panel 430 may not be guided to the bending portion 432, but may be grounded via the conductive plate 450 and/or surrounding conductive structures (e.g., a board and/or a conductive support member) electrically connected to a ground via the one or more exposed portions 451 and 452 of the conductive plate 450 protruding outward beyond the bending portion 532 when the display panel 430 is viewed from above.

Figure 7:
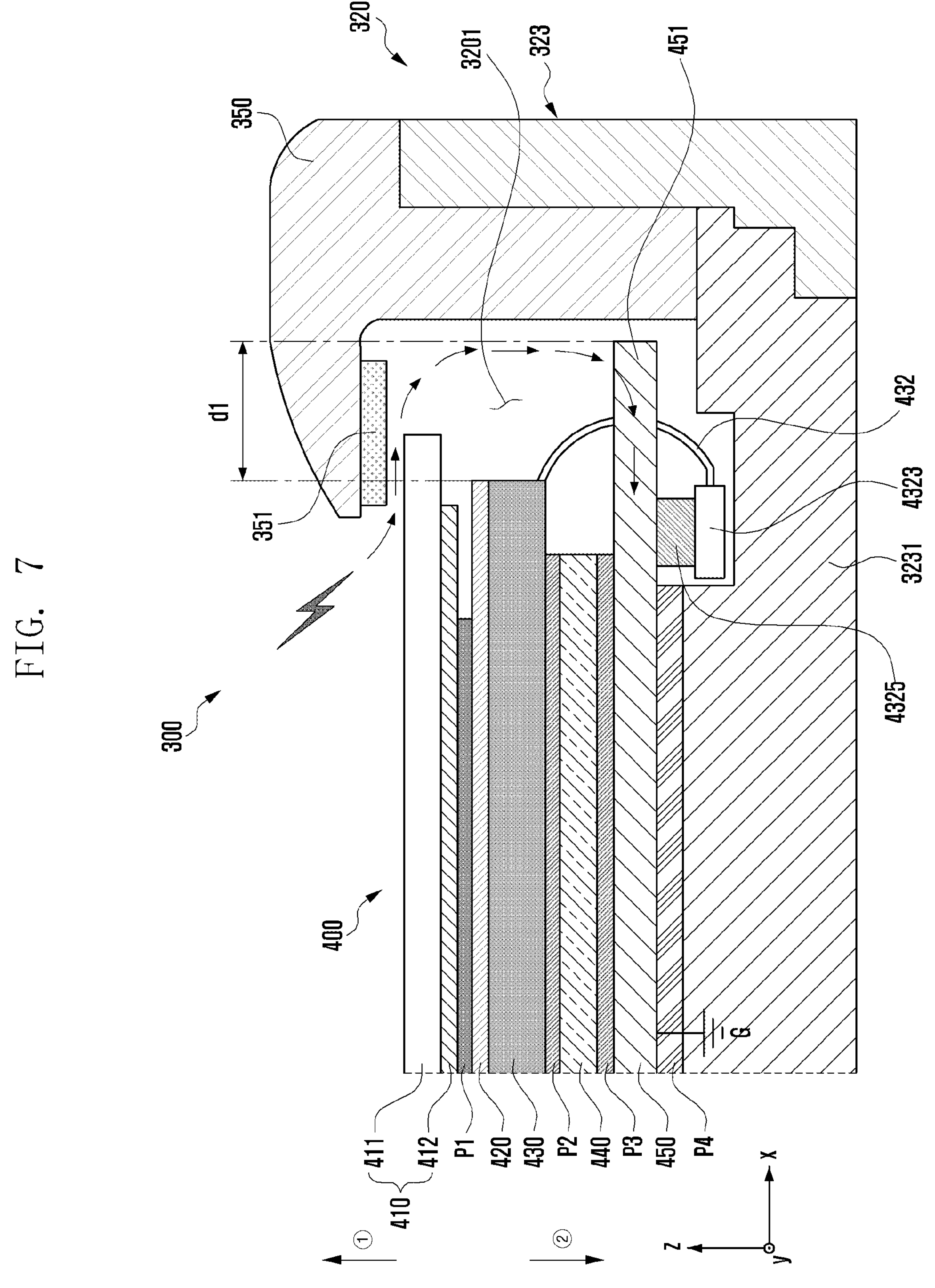
FIG. 7 is a partial cross-sectional view of an electronic device taken along line 7-7 in FIG. 4B according to various embodiments.

FIG. 7 is a partial cross-sectional view of an electronic device taken along line 7-7 of FIG. 4B according to various embodiments.

Referring to FIG. 7, the electronic device 300 may include a second housing 320 (hereinafter, "housing") including a second side member 323 (hereinafter, "side member"), a second protective frame 350 (hereinafter, "protective frame") disposed on at least a portion of the side member 323, and a flexible display 400 disposed between the side member 323 and the protective frame 350.

According to an embodiment, the flexible display 400 may be disposed to be supported by a second conductive support member 3231 (hereinafter, "conductive support member") which at least partially extends from the side member 323 to the second space of the housing 320 or is structurally coupled to the second space of the second housing 320. According to an embodiment, at least a portion of an edge of the flexible display 400 may be disposed in the inner space 3201 defined by at least a portion of the side member 323, the protective frame 350, and the conductive support member 3231. According to an embodiment, the edge of the flexible display 400 may be covered by the protective frame 350 to be invisible from the exterior.

According to various embodiments, the flexible display 400 may include a display panel 430. According to an embodiment, the flexible display 400 may include a window layer 410 disposed on the surface of the display panel 430 that is oriented in the first direction (direction ①), and a conductive plate 450 disposed on the surface of the display panel 430 that is oriented in a second direction (direction ②) opposite to the first direction (direction ①). According to an embodiment, the window layer 410 may include a polymer layer 411 (e.g., PET) and a glass layer 412 (e.g., UTG or polyimide) disposed under the polymer layer 411. According to an embodiment, the flexible display 400 may include a polarization layer 420 (e.g., POL) disposed between the display panel 430 and the glass layer 412. According to an embodiment, the flexible display 400 may include a polymer member 440 disposed between the display panel 430 and the conductive plate 450. According to an embodiment, the respective layers may be bonded to each other via adhesives P1, P2, and P3. According to an embodiment, the flexible display 400 may be attached to the conductive support member 3231 via an adhesive member P4. According to an embodiment, the electronic device 300 may further include a sealing member 351 disposed between the polymer layer 411 of the window layer 410 and the protective frame 350 to prevent and/or reduce the inflow of foreign substances from the exterior. According to an embodiment, the sealing member 351 may be formed of a conductive material.

According to various embodiments, the display panel 430 may include a bending portion 432 extending into the inner space 3201. According to an embodiment, the bending portion 432 may be bent around the edge of the display panel 430, and at least a portion of the FPCB 4323 connected to the bending portion 432 may be bonded to the rear surface of the conductive plate 450 via a conductive tape 4325. Accordingly, when the display panel 430 is viewed from above, the bending portion 432 may protrude toward the inner space 3201 beyond the edge of the display panel 430. According to an embodiment, the conductive plate 450 may include at least one exposed portion 451 extending to protrude beyond the edge of the display panel 430 in the vicinity of the bending portion 432 when the display panel 430 is viewed from above. According to an embodiment, the at least one exposed portion 451 may extend from the conductive plate 450 to have a first protrusion amount d1 from the edge of the display panel 430 when the display panel 430 is viewed from above. According to an embodiment, when the display panel 430 is viewed from above, the exposed portion 451 may coincide with or protrude beyond the bending portion 432.

According to an example embodiment, static electricity introduced into the inner space 3201 of the electronic device 300 through the space between the edge of the flexible display 400 and the protective frame 350 may be guided to the conductive plate 450 electrically connected to the ground (common ground) of the electronic device 300 via the exposed portion 451, which extends from the conductive plate 450 to coincide with or protrude beyond the bending portion 432. Therefore, the above-described electrostatic induction structure may be helpful for preventing/reducing malfunction of the display panel 430 and damage to the display panel 430, which are caused when the introduced static electricity is introduced into the display panel 430 via the bending portion 432, rather than the conductive plate 450.

Figure 8A:
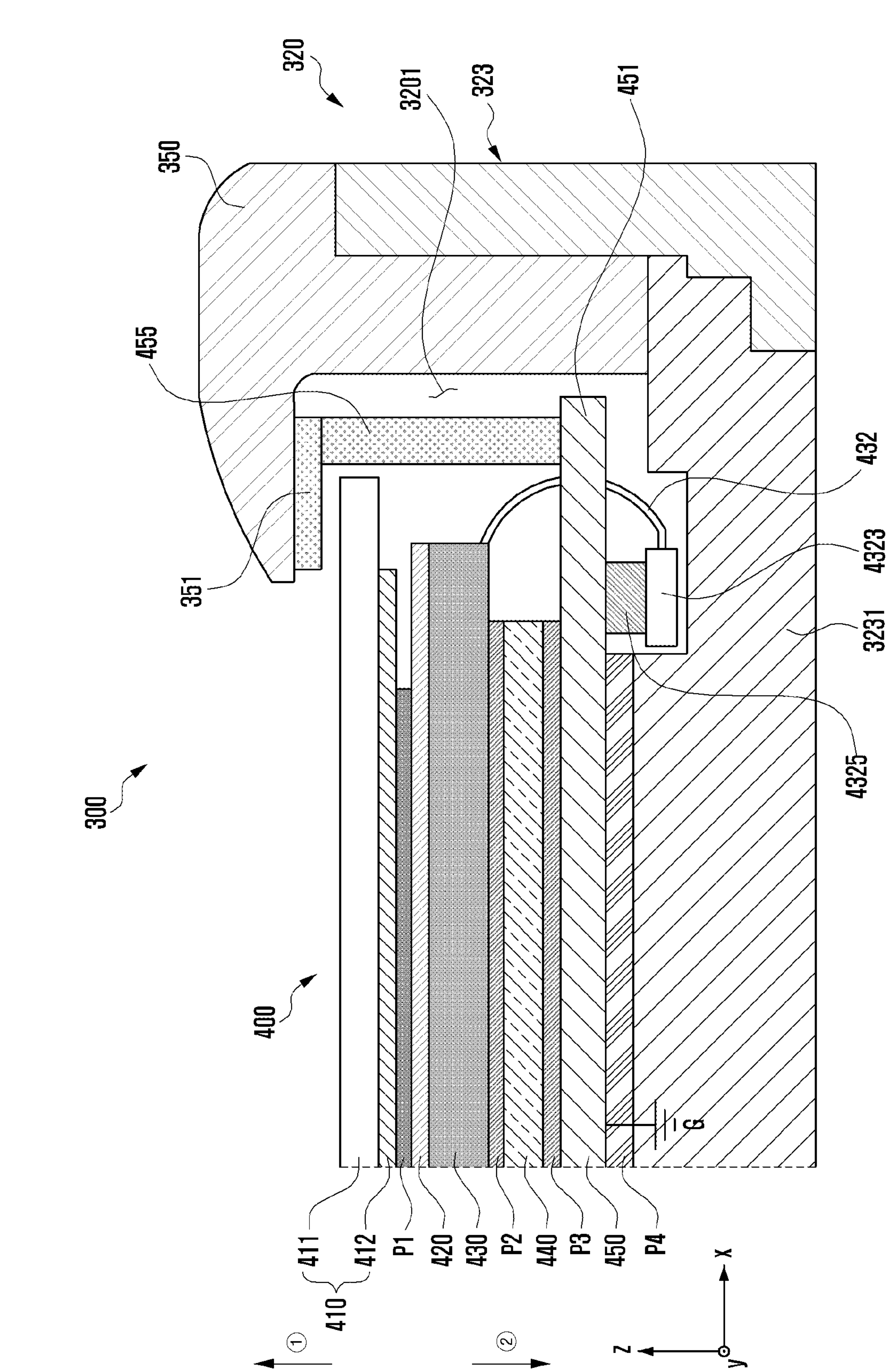
FIG. 8A is a partial cross-sectional view of an electronic device illustrating a state in which a conductive plate is electrically connected to a sealing member of a protective frame via a conductive connecting member according to various embodiments.

FIG. 8A is a partial cross-sectional view of an electronic device illustrating a state in which the conductive plate 450 is electrically connected to the sealing member 351 of the protective frame 350 via a conductive connecting member 455 according to various embodiments.

Figure 8B:
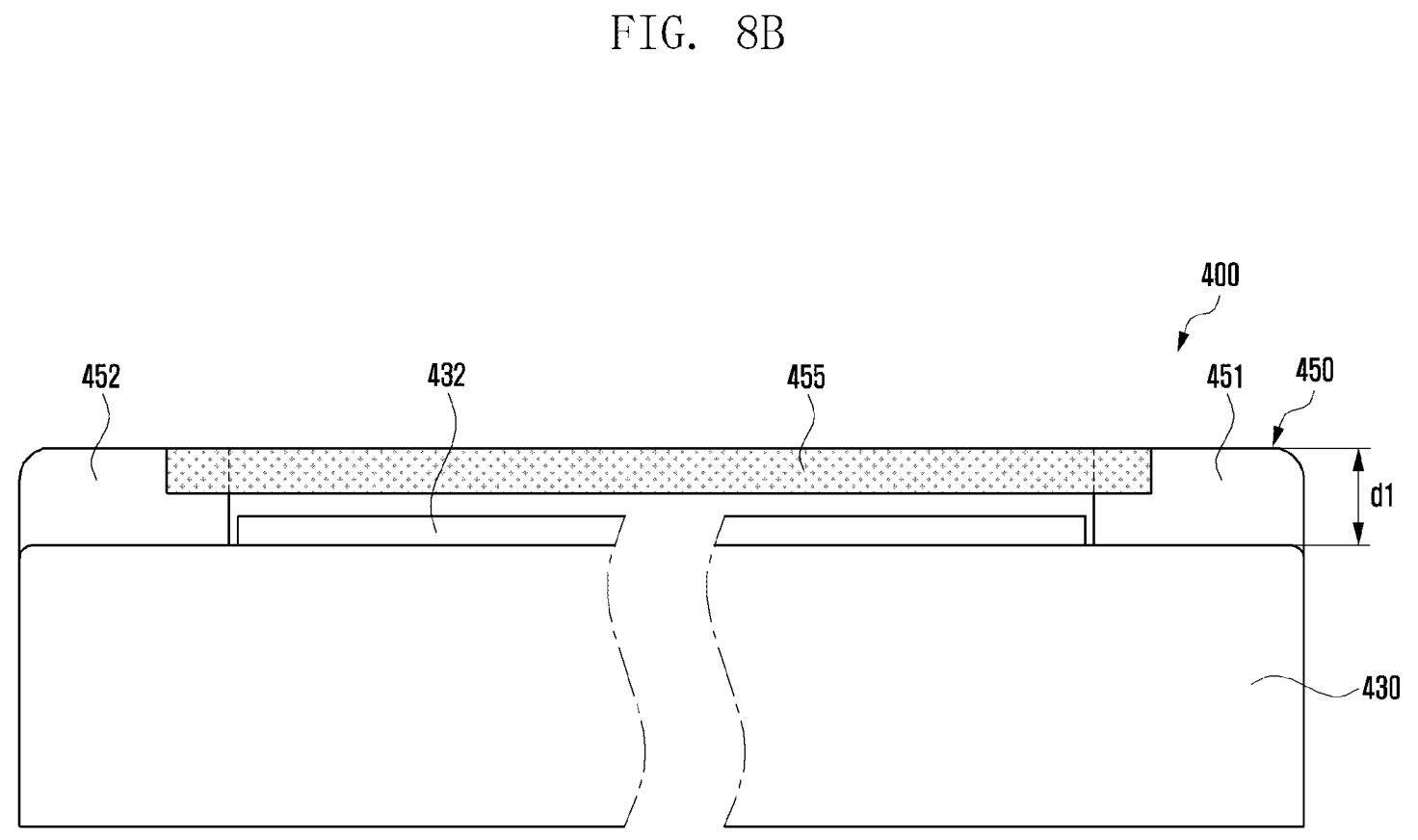

In describing the components of the electronic device 300 of FIGS. 8A and 8B, the same reference numerals are given to components that are substantially the same as those of the electronic device 300 of FIG. 7, and a detailed description thereof may not be repeated.

Referring to FIG. 8A, the exposed portion 451 of the conductive plate 450 may be connected to the conductive sealing member 351 via the conductive connecting member 455. According to an embodiment, the conductive connecting member 455 may include a conductive sponge, a conductive tape, or a conductive clip. In this case, static electricity introduced from the exterior may be guided to the exposed portion 451 and the conductive plate 450 via the conductive connecting member 455.

Referring to FIG. 8B, in order to guide static electricity, the conductive connecting member 455 may have a length electrically interconnecting two exposed portions 451 and 452 protruding with the bending portion 432 of the conductive plate 450 interposed therebetween. In various embodiments, the two exposed portions 451 and 452 may be electrically connected to different positions of the sealing member 351 via separate conductive connecting members, respectively.

Figure 9A:
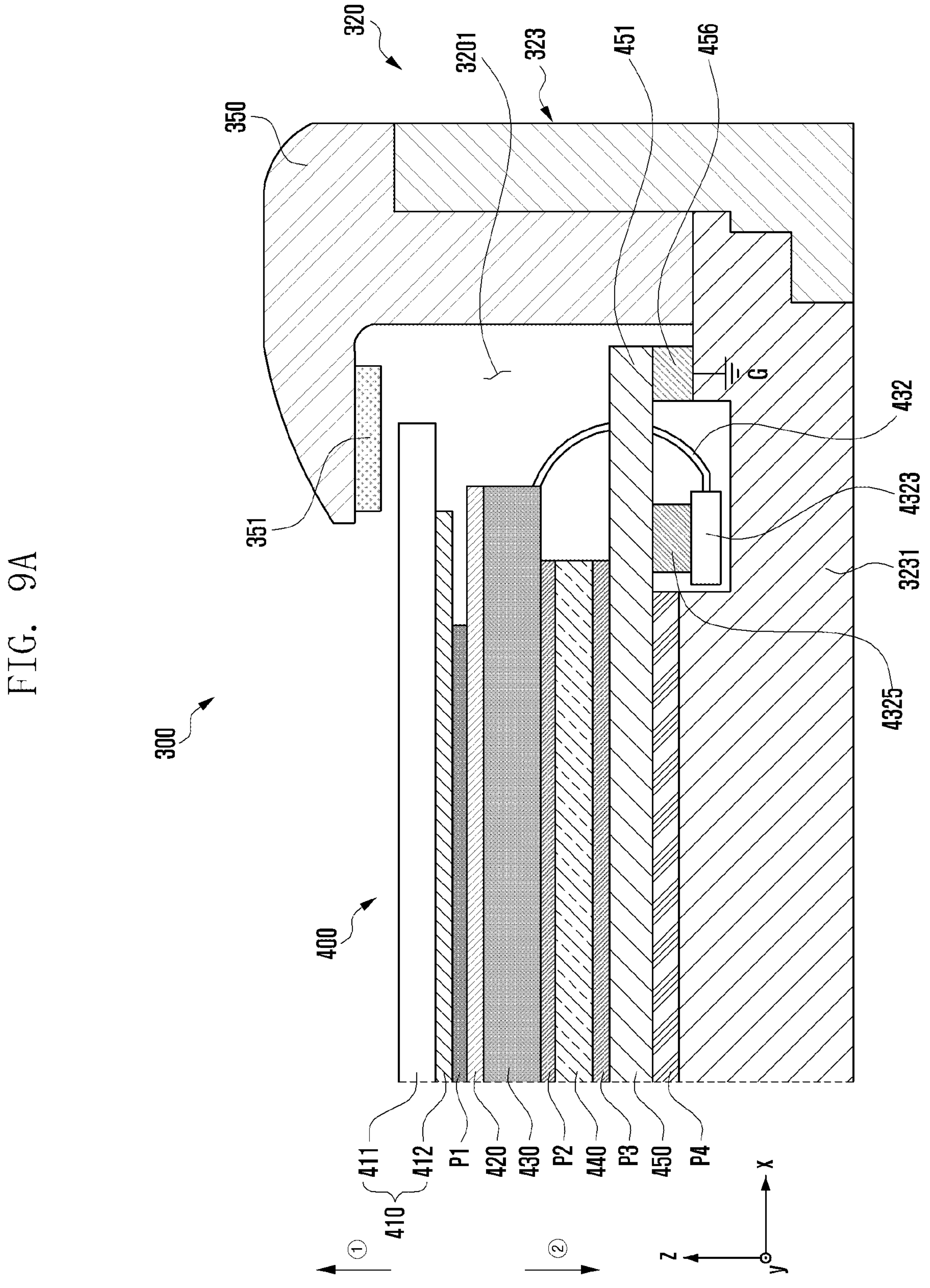
FIG. 9A is a partial cross-sectional view of an electronic device illustrating a state in which a conductive plate is electrically connected to a conductive support member of a side member via a conductive connecting member according to various embodiments.

FIG. 9A is a partial cross-sectional view of an electronic device 300 illustrating a state in which the conductive plate 450 is electrically connected to the conductive support member 3231 of the side member 323 via the conductive connecting member 456 according to various embodiments.

In describing the components of the electronic device 300 of FIG. 9A, the same reference numerals are given to components that are substantially the same as those of the electronic device 300 of FIG. 7, and a detailed description thereof may not be repeated.

Referring to FIG. 9A, the exposed portion 451 of the conductive plate 450 may be connected to the conductive structure 3231 disposed in the electronic device 300 via the conductive connecting member 456. The conductive connecting member 456 may include a conductive sponge, a conductive tape, or a conductive clip. According to an embodiment, the conductive structure 3231 may include at least one of a conductive support member 3231 (e.g., a conductive bracket or a conductive front structure) disposed in the inner space 3201 of the electronic device 300 and electrically connected to a ground, a board (e.g., the printed circuit board 172 in FIG. 3), or a shield can. In this case, static electricity introduced from the exterior may be guided to the ground of the board via the conductive structure 3231 connected via the exposed portion of the conductive plate 450 and the conductive connecting member 456.

In various embodiments, at least a portion of the conductive support member 3231 may protrude toward the conductive plate 450, thereby being helpful for improving adhesiveness to the conductive connecting member 456. In various embodiments, at least a portion of the conductive side member 323 electrically connected to the ground G may be disposed to be exposed through the conductive support member 3231 in the inner space 3201. In this case, the conductive connecting member 456 may be disposed to electrically interconnect the conductive plate 450 and the exposed portion of the conductive side member 323.

Figure 9B:
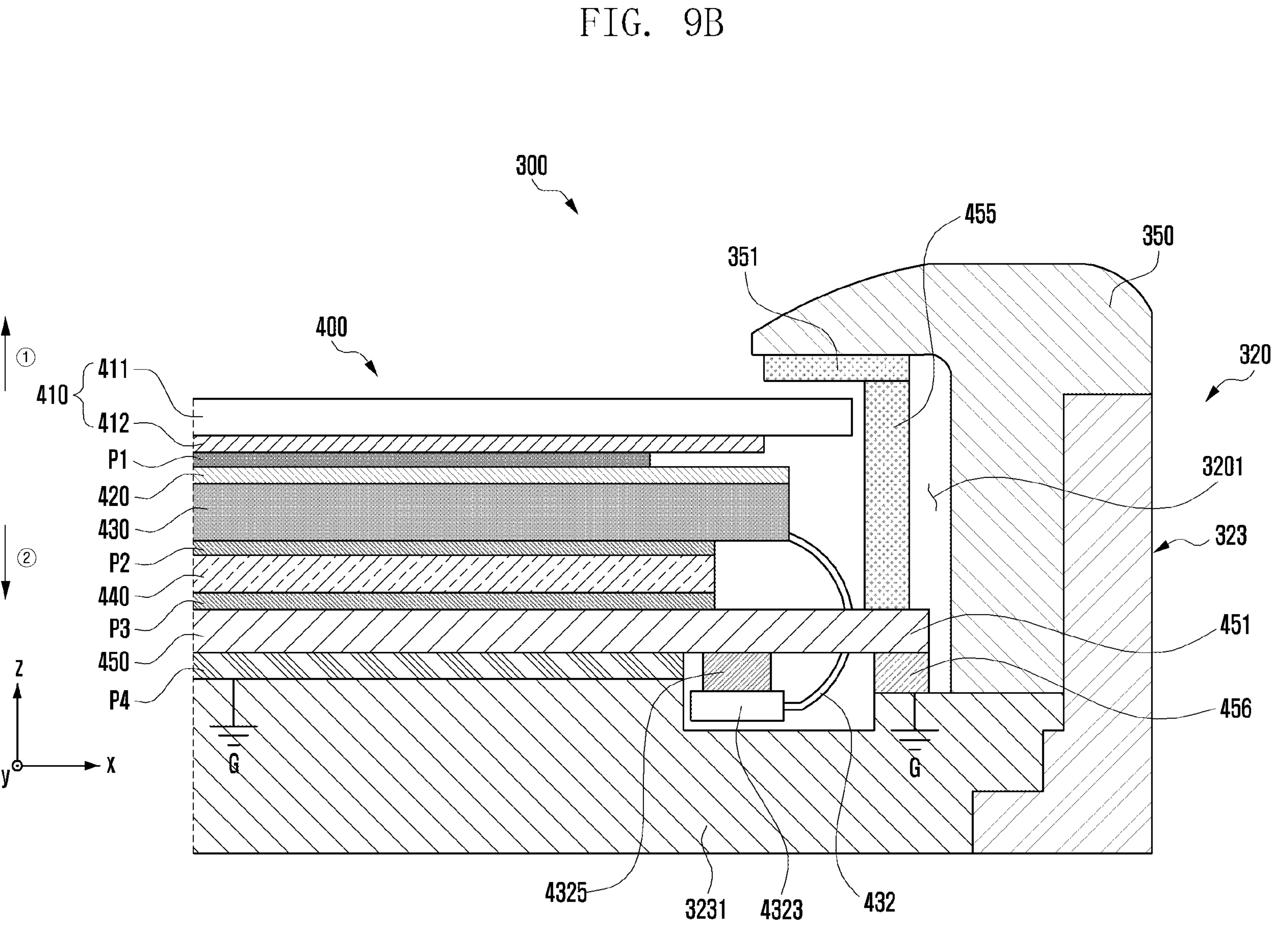
FIG. 9B is a partial cross-sectional view of an electronic device illustrating a state in which a conductive plate is electrically connected to a sealing member of a protective frame and a conductive support member of a side member via conductive connecting members according to various embodiments.

FIG. 9B is a partial cross-sectional view of an electronic device illustrating in which the conductive plate 450 is electrically connected to the sealing member 351 of the protective frame 350 and the conductive side member 3231 of the side member 323 via the conductive connecting members 455 and 456 according to various embodiments.

In describing the components of the electronic device 300 of FIG. 9B, the same reference numerals are given to components that are substantially the same as those of the electronic device 300 of FIGS. 8A and 9A, and a detailed description thereof may not be repeated.

Referring to FIG. 9B, in order to provide a static electricity guide structure, the exposed portion 451 of the conductive plate 450 may be in contact with the conductive sealing member 351 via the conductive connecting member 455 illustrated in FIG. 8A and may be simultaneously connected to the conductive structure 3231 via the conductive connecting member 456 illustrated in FIG. 9A. In this case, static electricity introduced from the exterior may be guided using both a first path in which the static electricity is guided to the conductive plate 450 via the exposed portion 451 and a second path in which the static electricity is guided to the ground of the board (e.g., the printed circuit board 172 in FIG. 3) via the conductive structure 3231.

Figure 10A:
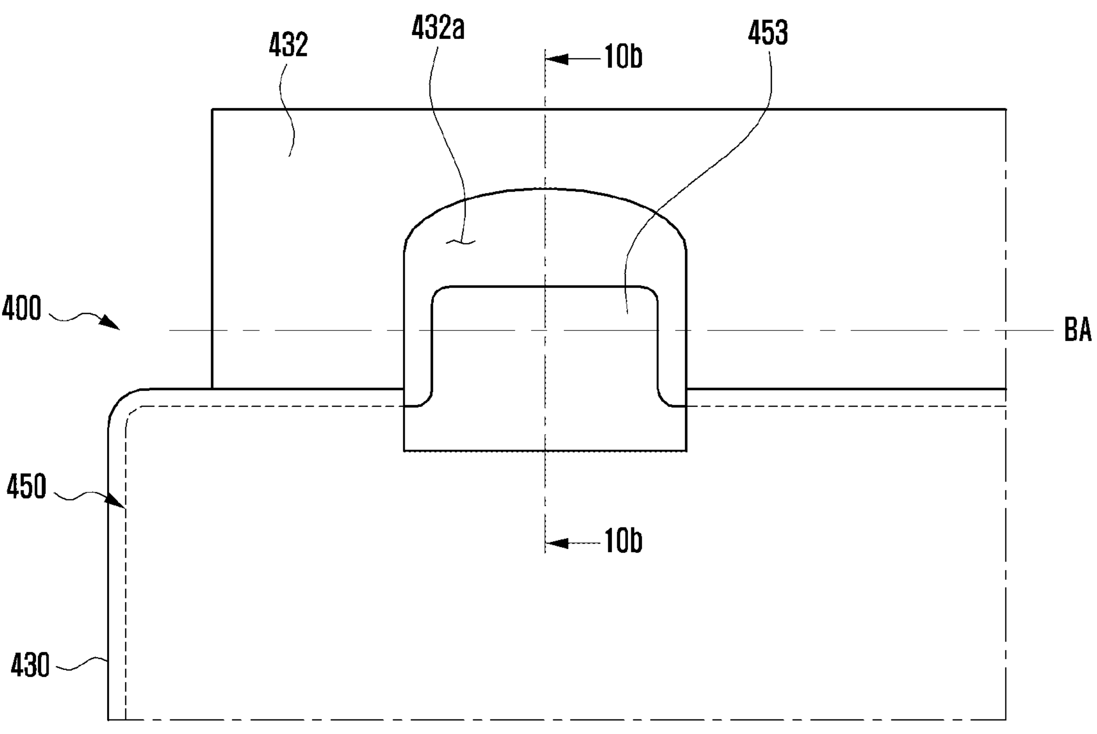
FIG. 10A is a diagram illustrating an opening formed in a bending portion and an exposed portion of a conductive plate according to various embodiments.
Figure 10B:
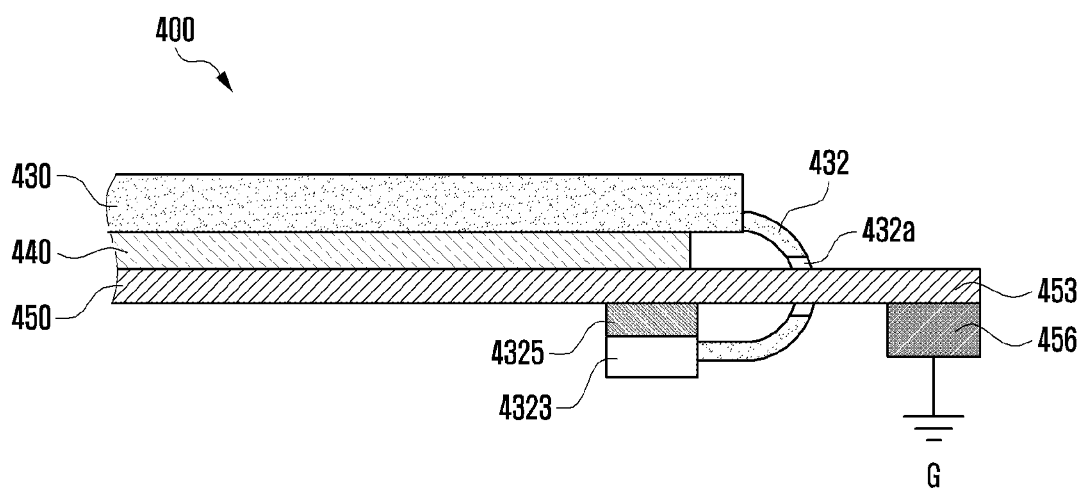
FIG. 10B is a partial cross-sectional view of the flexible display taken along line 10*b*-10*b* in FIG. 10A in a state in which the bending portion is bent according to various embodiments.

FIG. 10A is a diagram illustrating an opening 432*a* formed in the bending portion 432 and the exposed portion 453 of the conductive plate 450 according to various embodiments. FIG. 10B is a partial cross-sectional view of the flexible display 400 taken along line 10*b*-10*b* of FIG. 10A in a state in which the bending portion 432 is bent according to various embodiments.

Referring to FIGS. 10A and 10B, the exposed portion 453 of the conductive plate 450 may protrude through at least a portion of the bending portion 432 rather than near the bending portion 432. For example, the bending portion 432 may include an opening 432*a* at least partially having a predetermined shape and size. According to an embodiment, the opening 432*a* may have a size and shape that allow the exposed portion 453 to pass the opening 432*a* even when the bending portion 432 has a shape bent with respect to the bending axis BA. According to an embodiment, the wiring structure disposed in the bending portion 432 may be designed to avoid the opening 432*a*. Accordingly, when the conductive plate 450 is disposed on the rear surface of the display panel 430 with the polymer member 440 interposed therebetween, the exposed portion 453 may pass through the opening 432*a* formed in the bending portion 432 and may then be connected to the ground G of the electronic device via the conductive connecting member 456. In various embodiments, a plurality of exposed portions 453 protruding from the conductive plate 450 may be provided to have a predetermined interval, and corresponding openings 432*a*, the number of which corresponds to that of the exposed portions, 453 may also be formed. In various embodiments, the openings 432*a* may be formed in a size and shape to accommodate two or more exposed portions of the plurality of exposed portions together. In various embodiments, the conductive plate 450 may include an exposed portion 453 provided to pass through the opening 432A, and exposed portions (e.g., the exposed portions 451 and 452 in FIG. 6B) provided around the above-described bending portion 432, together.

Figure 11A:
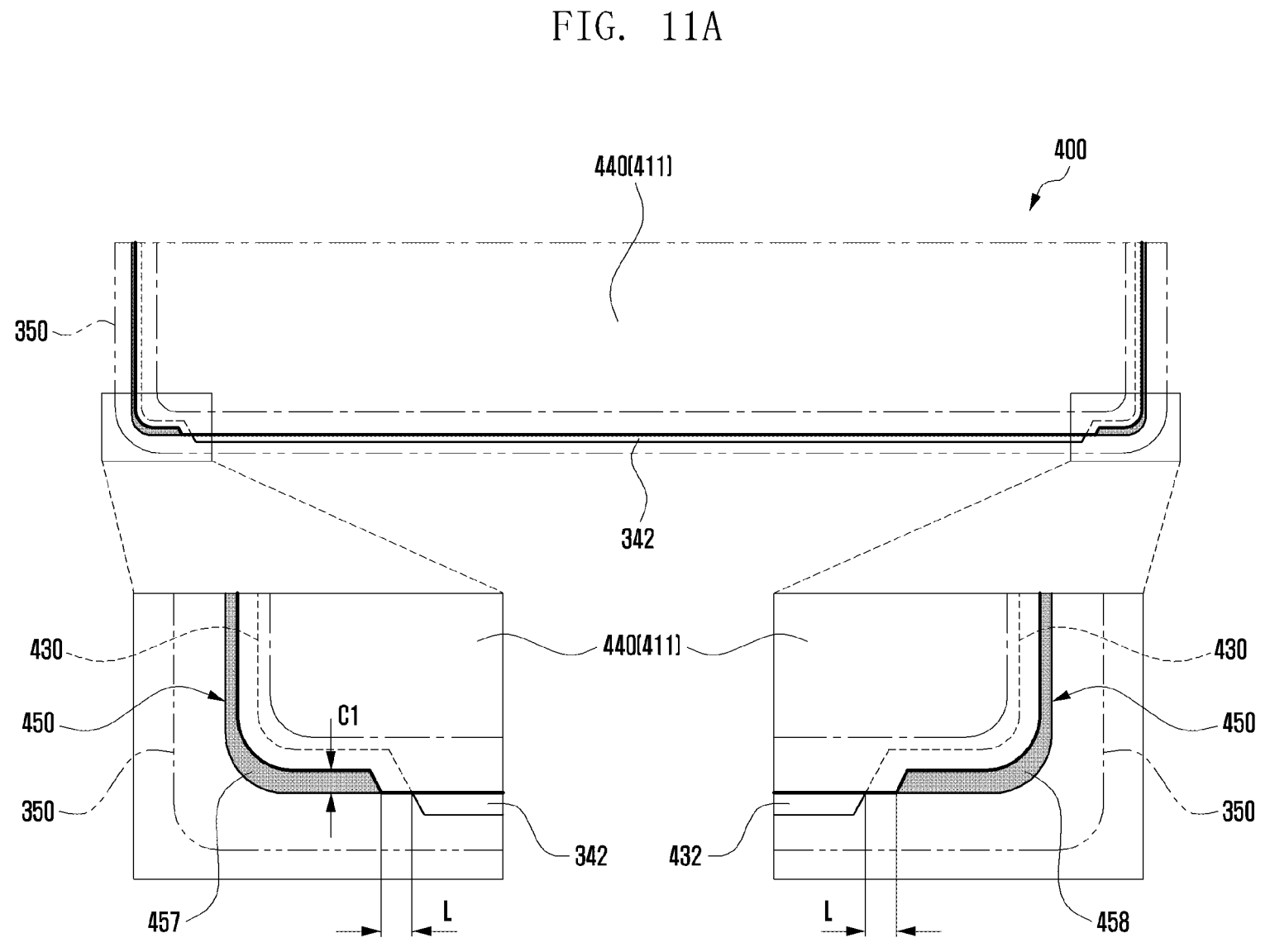
Figure 11B:
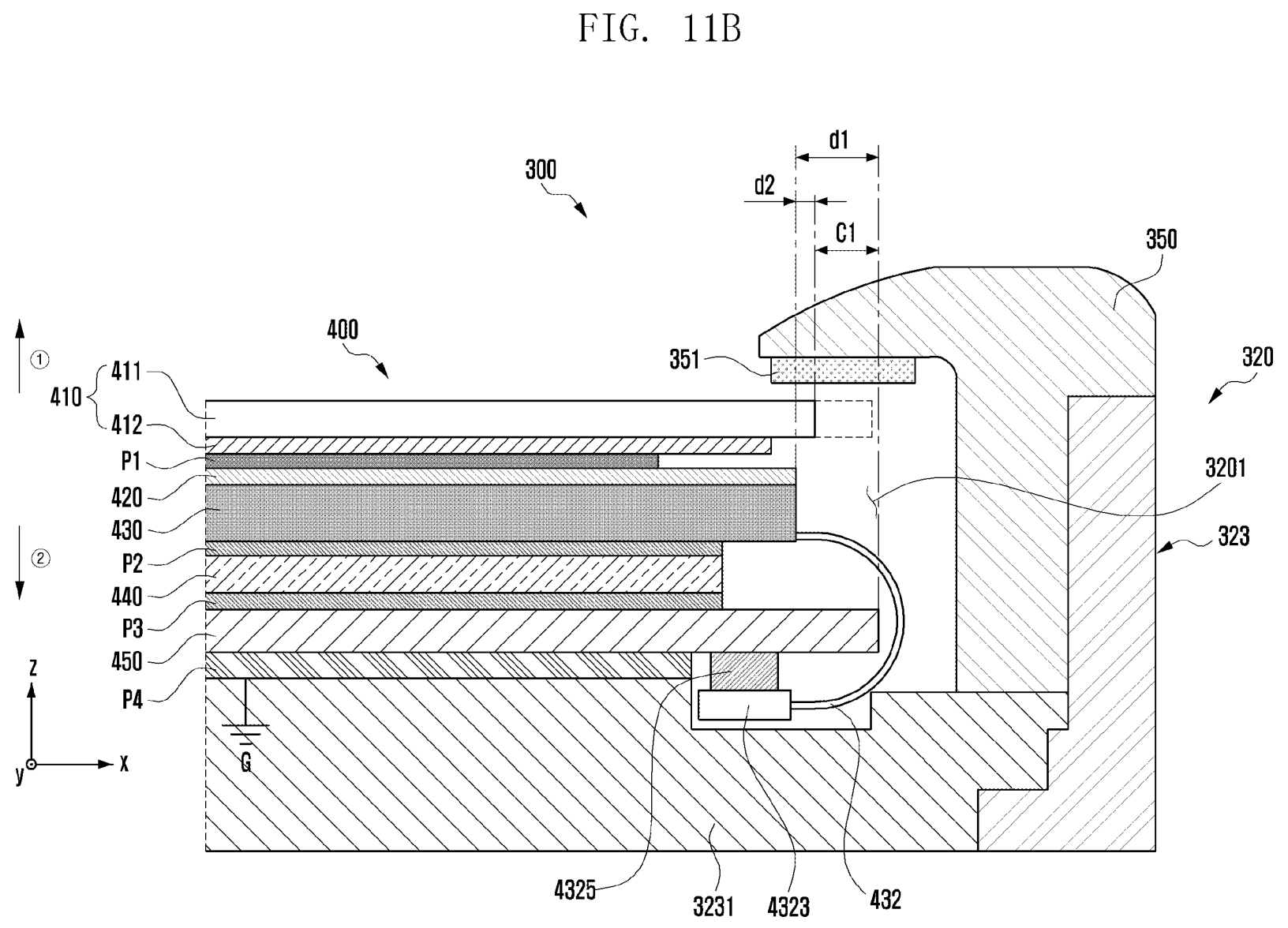

FIG. 11A is a diagram illustrating a flexible display 400 illustrating a conductive plate 450 and a window layer 410 according to various embodiments. FIG. 11B is a partial cross-sectional view of an electronic device to which the conductive plate 450 and the window layer 410 of FIG. 11A are applied according to various embodiments.

In describing the components of the electronic device 300 of FIG. 11B, the same reference numerals are given to components that are substantially the same as those of the electronic device 300 of FIG. 7, and a detailed description thereof may not be repeated.

Referring to FIG. 11A, the static electricity guide structure may be provided via a structural change of the window layer 410 (e.g., the polymer layer 411). According to an embodiment, when the flexible display 400 is viewed from above, by changing the shape of at least a portion of the window layer 410, the conductive plate 450 may include exposed portions 457 and 458, which are exposed by a predetermined width C1, in a portion of an edge thereof around the bending portion 432. In this case, when the flexible display 400 is viewed from above, even if the conductive plate 450 is exposed to be visible, the exposed portions 457 and 458 may be covered by the protective frame 350 disposed thereabove. According to an embodiment, when the flexible display 400 is viewed from above, the exposed portions 457 and 458 of the conductive plate 450 may be provided in a portion spaced apart from the bending portion 432 by a predetermined distance L so that the bending portion 432 is not identified with the naked eye through the window layer 410.

Referring to FIG. 11B, when the flexible display 400 is viewed from above, the conductive plate 450 may protrude toward the inner space 3201 beyond the edge of the display panel 430 to have a first protrusion amount d1. According to an embodiment, when the flexible display 400 is viewed from above, the window layer 410 may be disposed to further protrude toward the inner space beyond the edge of the display panel to have a second protrusion amount d2. According to an embodiment, the first protrusion amount d1 may be greater than the second protrusion amount d2. Accordingly, when the flexible display 400 is viewed from above, the conductive plate 450 may be exposed by a portion excluding the second protrusion amount d2 from the first protrusion amount d1.

According to various embodiments, through the structural change of the window layer 410, static electricity introduced from the exterior of the electronic device 300 is guided to the exposed portions 457 and 458 of the conductive plate 450 protruding toward the inner space 3201 beyond the window layer 410 when the flexible display 400 is viewed from above, which may be helpful for preventing/reducing malfunction of the display panel 430 and/or damage to the display panel 430.

According to various example embodiments, an electronic device (e.g., the electronic device 300 in FIG. 4A) may include: a first housing (e.g., the first housing 310 in FIG. 4A); a second housing (e.g., the second housing 320 in FIG. 4A); an hinge device (e.g., the hinge device 364 in FIG. 4A) configured to foldably interconnect the first housing and the second housing; and a flexible display (e.g., the flexible display 400 in FIG. 4A) supported from the first housing to the second housing across the hinge device, wherein the flexible display may include: a window layer (e.g., the window layer 410 in FIG. 7); a display panel (e.g., the display panel 430 in FIG. 7) disposed under the window layer corresponding to the second housing and including a bending portion (e.g., the bending portion 432 in FIG. 7) at least partially extending outward; and a conductive plate (e.g., the conductive plate 450 in FIG. 7) disposed under the display panel and electrically connected to a ground, wherein the bending portion may include a flexible display bypassing the rear surface of the conductive plate and electrically connected to the rear surface of the conductive plate, and the conductive plate may include at least one exposed portion (e.g., the exposed portion 451 in FIG. 7) exposed to the outside of an edge of the display panel around the bending portion when the display panel is viewed from above.

According to various example embodiments, the at least one exposed portion may extend from an edge of the conductive plate.

According to various example embodiments, the at least one exposed portion may be further exposed to the outside of the bending portion when the flexible display is viewed from above.

According to various example embodiments, the window layer may further protrude outward beyond the display panel when the flexible display is viewed from above.

According to various example embodiments, the electronic device may further include a protective frame disposed in the second housing with an edge of the flexible display interposed between the protective frame and the second housing, wherein the edge of the flexible display may be disposed to be invisible from exterior through the protective frame.

According to various example embodiments, the electronic device may further include a conductive seal disposed between the protective frame and the window layer.

According to various example embodiments, the at least one exposed portion may be electrically connected to the conductive seal via at least one first conductive connecting member.

According to various example embodiments, the at least one exposed portion may include: a first exposed portion extending from the conductive plate at one side of the bending portion; and a second exposed portion extending from the conductive plate at another side of the bending portion.

According to various example embodiments, the at least one first conductive connecting member may have a length extending from the first exposed portion to the second exposed portion and may be electrically connected to the conductive seal.

According to various example embodiments, the at least one first conductive connecting member may individually electrically connect each of the first exposed portion and the second exposed portion to the conductive seal.

According to various example embodiments, the at least one exposed portion may include: a first exposed portion extending from the conductive plate at one side of the bending portion; and a second exposed portion extending from the conductive plate at another side of the bending portion.

According to various example embodiments, the first exposed portion and the second exposed portion may be electrically connected to each other via a second conductive connecting member.

According to various example embodiments, the at least one exposed portion may be electrically connected to a conductive disposed in an inner space of the second housing and electrically connected to the ground via at least one third conductive connecting member.

According to various example embodiments, the conductive structure may include a board disposed in the inner space of the second housing and/or a conductive support extending from the side member to the inner space.

According to various example embodiments, at least a portion of the conductive support may be disposed to support at least a portion of the flexible display.

According to various example embodiments, the bending portion may include at least one opening at least partially having a specified shape, and the at least one exposed portion may be disposed to pass through the at least one opening.

According to various example embodiments, the at least one exposed portion may include two or more exposed portions, and the two or more exposed portions may be disposed to pass through one opening.

According to various example embodiments, the at least one exposed portion may be disposed through a shape change of at least partially removing an edge of the window layer when the flexible display is viewed from above.

According to various example embodiments, the bending portion and the exposed portion may be spaced apart from each other by a specified distance to be invisible from the exterior.

According to various example embodiments, the window layer may include a polymer layer and a glass layer smaller than the polymer layer, and the exposed portion may be disposed through a shape change of the polymer layer.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a first housing;

a second housing;

a hinge device configured to foldably interconnect the first housing and the second housing; and a flexible display supported from the first housing to the second housing across the hinge device, wherein the flexible display comprises:

a window layer;

a display panel disposed under the window layer;

a conductive plate disposed under the display panel and electrically connected to a ground; and a bending portion extending from the display panel and folding around an edge of the conductive plate to a rear surface of the conductive plate such that the display panel is electrically connected to the rear surface of the conductive plate via the bending portion, wherein the conductive plate comprises at least one exposed portion which extends beyond an edge of the display panel around the bending portion.

2. The electronic device of claim 1, wherein the at least one exposed portion extends from an edge of the conductive plate.

3. The electronic device of claim 1, wherein the at least one exposed portion is further exposed outside of the bending portion.

4. The electronic device of claim 1, wherein the window layer further protrudes outward beyond the display panel.

5. The electronic device of claim 1, further comprising a protective frame disposed in the second housing with an edge of the flexible display interposed between the protective frame and the second housing, wherein the edge of the flexible display is disposed to be invisible from exterior through the protective frame.

6. The electronic device of claim 5, further comprising a conductive seal disposed between the protective frame and the window layer.

7. The electronic device of claim 6, wherein the at least one exposed portion is electrically connected to the conductive seal via at least one first conductive connecting member.

8. The electronic device of claim 7, wherein the at least one exposed portion comprises:

a first exposed portion extending from the conductive plate at one side of the bending portion; and a second exposed portion extending from the conductive plate at another side of the bending portion.

9. The electronic device of claim 8, wherein the at least one first conductive connecting member has a length extending from the first exposed portion to the second exposed portion and is electrically connected to the conductive seal.

10. The electronic device of claim 8, wherein the at least one first conductive connecting member electrically connects each of the first exposed portion and the second exposed portion to the conductive seal.

11. The electronic device of claim 1, wherein the at least one exposed portion comprises:

a first exposed portion extending from the conductive plate at one side of the bending portion; and a second exposed portion extending from the conductive plate at another side of the bending portion.

12. The electronic device of claim 11, wherein the first exposed portion and the second exposed portion are electrically connected to each other via a second conductive connecting member.

13. The electronic device of claim 1, wherein the at least one exposed portion is electrically connected to a conductive structure disposed in an inner space of the second housing and electrically connected to the ground, via at least one third conductive connecting member.

14. The electronic device of claim 13, wherein the conductive structure comprises a board disposed in the inner space of the second housing and/or a conductive support extending from a side of the second housing to the inner space.

15. The electronic device of claim 14, wherein at least a portion of the conductive support is disposed to support at least a portion of the flexible display.

16. The electronic device of claim 1, wherein the bending portion includes at least one opening at least partially having a predetermined specified shape, wherein the at least one exposed portion is disposed to pass through the at least one opening.

17. The electronic device of claim 1, wherein the at least one exposed portion includes two or more exposed portions, and wherein the two or more exposed portions are disposed to pass through one opening.

18. The electronic device of claim 1, wherein the at least one exposed portion is disposed through a shape change of at least partially removing an edge of the window layer when the flexible display is viewed from above.

19. The electronic device of claim 18, wherein the bending portion and the exposed portion is spaced apart from each other by a predetermined specified distance to be invisible from the exterior.

20. The electronic device of claim 18, wherein the window layer includes a polymer layer and a glass layer configured to be smaller than the polymer layer, and wherein the exposed portion may be disposed through a shape change of the polymer layer.

* * * * *